(12) United States Patent
Fathi et al.

(10) Patent No.: US 11,741,703 B2
(45) Date of Patent: Aug. 29, 2023

(54) IN DATA ACQUISITION, PROCESSING, AND OUTPUT GENERATION FOR USE IN ANALYSIS OF ONE OR A COLLECTION OF PHYSICAL ASSETS OF INTEREST

(71) Applicant: Pointivo, Inc., Atlanta, GA (US)

(72) Inventors: Habib Fathi, Atlanta, GA (US); Jacob B. Garland, Peachtree Corners, GA (US); William Wilkins, Suwanee, GA (US); Daniel Ciprari, Atlanta, GA (US)

(73) Assignee: POINTIVO, INC., Atlanta, GA (US)

( * ) Notice: Subject to any disclaimer, the term of this patent is extended or adjusted under 35 U.S.C. 154(b) by 192 days.

(21) Appl. No.: 16/568,104

(22) Filed: Sep. 11, 2019

(65) Prior Publication Data

US 2020/0082168 A1    Mar. 12, 2020

Related U.S. Application Data

(60) Provisional application No. 62/729,982, filed on Sep. 11, 2018.

(51) Int. Cl.
*G06V 20/10* (2022.01)
*B64U 101/30* (2023.01)
(Continued)

(52) U.S. Cl.
CPC .......... *G06V 20/176* (2022.01); *B64C 39/024* (2013.01); *G06T 7/521* (2017.01);
(Continued)

(58) Field of Classification Search
CPC ..... G06K 2009/00738; G06K 9/00637; G06K 9/66; G06K 9/3233; G06T 2207/10032;
(Continued)

(56) References Cited

U.S. PATENT DOCUMENTS 9,162,753 B1 * 10/2015 Panto ................... G08G 5/0069
2005/0165731 A1    7/2005 Funk
(Continued)

OTHER PUBLICATIONS

Ham et al., 2016, "Visual monitoring of civil infrastructure systems via camera-equipped Unmanned Aerial Vehicles (UAVs): a review of related works", I. Visualization in Engineering (2016) 4:1, pp. 1-8, DOI 10.1186/s40327-015-0029-z.*
(Continued)

*Primary Examiner* — Guillermo M Rivera-Martinez
(74) *Attorney, Agent, or Firm* — Thomas | Horstemeyer, LLP

(57) ABSTRACT

Various examples are provided for data acquisition, processing, and output generation for use in analysis of a physical asset or a collection of physical assets of interest. In one example, a method includes providing a user information goal including user information for acquisition, processing, or output of data associated with a physical asset or collection of physical assets; and evaluating existing database information to determine whether all or part of the first user information goal can be substantially completed by retrieval and processing of an information set obtainable from existing database information. If the user information goal cannot substantially be completed using the information set, then a data acquisition plan configured to acquire data needed to substantially complete first user information goal can be generated. If the user information goal can be substantially completed using the information set, then the formation set can be processed to provide an output.

20 Claims, 3 Drawing Sheets

(51) Int. Cl.
*B64C 39/02* (2023.01)
*G06T 7/521* (2017.01)
*B64U 101/20* (2023.01)

(52) U.S. Cl.
CPC .......... *G06V 20/10* (2022.01); *B64U 2101/20* (2023.01); *B64U 2101/30* (2023.01); *G06T 2207/30184* (2013.01); *G06V 20/194* (2022.01)

(58) Field of Classification Search
CPC . G06T 2207/10028; G06T 2207/30184; G06T 7/75; G06T 7/97; G06T 2200/08; G06T 2207/30108
See application file for complete search history.

(56) References Cited

U.S. PATENT DOCUMENTS

| | | | |
|---|---|---|---|
| 2006/0047705 A1 | 3/2006 | Reade et al. | |
| 2009/0265193 A1* | 10/2009 | Collins | G06Q 30/0185 705/4 |
| 2010/0268409 A1* | 10/2010 | Vian | G05D 1/104 701/24 |
| 2012/0173300 A1* | 7/2012 | Davenport | G06Q 99/00 705/7.28 |
| 2012/0300059 A1* | 11/2012 | Stege | F03D 17/00 348/114 |
| 2013/0138606 A1* | 5/2013 | Kahle | G06Q 10/06 707/609 |
| 2013/0216089 A1* | 8/2013 | Chen | G06T 7/0002 382/100 |
| 2016/0313736 A1* | 10/2016 | Schultz | G06T 11/60 |
| 2017/0192424 A1* | 7/2017 | Poole | H04N 7/183 |
| 2017/0206648 A1* | 7/2017 | Marra | G01C 21/20 |
| 2017/0236024 A1* | 8/2017 | Wang | G06K 9/6221 382/201 |
| 2017/0270612 A1* | 9/2017 | Howe | G06Q 30/0278 |
| 2017/0277187 A1* | 9/2017 | Refai | H04N 7/185 |
| 2017/0278408 A1 | 9/2017 | Gordon et al. | |
| 2018/0003656 A1* | 1/2018 | Michini | H02S 50/10 |
| 2018/0004207 A1* | 1/2018 | Michini | G08G 5/0069 |
| 2018/0109767 A1* | 4/2018 | Li | H04N 7/188 |
| 2018/0123707 A1* | 5/2018 | Morishige | H04B 7/0634 |
| 2018/0129211 A1* | 5/2018 | Vidyadharan | B64C 39/024 |
| 2018/0165503 A1* | 6/2018 | Larson | B64D 47/08 |
| 2018/0174357 A1* | 6/2018 | Priest | H04W 16/24 |
| 2018/0322699 A1* | 11/2018 | Gray | G06T 19/003 |

OTHER PUBLICATIONS

International Search Report and Written Opinion for PCT/US2019/050675 dated Nov. 20, 2019.

* cited by examiner

IN DATA ACQUISITION, PROCESSING, AND OUTPUT GENERATION FOR USE IN ANALYSIS OF ONE OR A COLLECTION OF PHYSICAL ASSETS OF INTEREST

CROSS-REFERENCE TO RELATED APPLICATIONS

This application claims priority to U.S. Provisional Application No. 62/729,982, filed Sep. 11, 2018. The disclosure of this application is incorporated herein in its entirety by this reference.

STATEMENT OF GOVERNMENT INTEREST

This invention was made with government support under contract numbers 1519971 and 1632248 awarded by the National Science Foundation. The Government has certain rights in the invention.

BACKGROUND

With recent advances in technology, automated data capture using sensors has increasingly supplanted data capture by humans. Sensors used to generate information about physical assets that may be of interest, such as roofs, buildings, infrastructure components, and other valuable elements, generally are configured with imaging devices that obtain image and, if applicable, other sensor data that can be processed to provide 2D/3D information such as point clouds, 2D wireframe renderings, 3D reconstructions, thermal characteristics, radio frequency (RF) characteristics etc. While some might understand that data acquisition of physical assets, such as roofs, buildings, infrastructure elements etc. should be directed toward a goal of obtaining improved accuracy (e.g., accurate measurements, enhanced detail, etc.) and thus more complete data collection during an imaging process, this is not always the case.

For example, data acquisition for residential roofs using unmanned aerial vehicles (UAV) equipped with sensors has replaced much of the time-consuming, and often dangerous, work involved in measuring and evaluating roofs for damage assessment, insurance underwriting, and related use cases. Such UAVs can be navigated by an operator present at a remote location or on-site. When these "drone" flights are conducted with a suitable flight plan, acquired sensor data can generate accurate, or close-to-accurate, measurements and other information about the roof structure of interest and relevant surrounding locations. Such sensor data acquisition plans, and information derivable therefrom, are disclosed, for example, in U.S. patent application Ser. No. 16/440,735 ("the '735 Application"), the disclosure of which is incorporated herein in its entirety by this reference.

A user for which such information is provided can obtain one or more types of value therefrom. In non-limiting examples, a roofing contractor or an insurance company, can greatly reduce the cost, time and effort required to generate information necessary to allow them or their customers to make better decisions about roof construction/repair, maintenance, and underwriting. An example of a use case where less accurate, such as qualitative information may be appropriate can be for insurance underwriting or an assessment of basic information about a physical asset such as a residential roof, for example, the general size, shape, materials used etc. Such qualitative information can, for example, provide a roofing contractor with information to inform subsequent efforts, such as whether he would like to perform repair work on the subject roof. While it could be possible to generate image data for the subject roof via complete and comprehensive image capture, such efforts may be "overkill" for a specific use case. In contrast, other use cases may require more complete 3D information of the subject roof derived from images, such as when an accurate 3D reconstruction of the subject roof is to be generated automatically. Such automatic and accurate 3D reconstructions have utility when more precise measurements—that is, measurements derived from 3D reconstructions that are substantially equivalent to the real-life measurements of the subject roof—are needed. Such accurate measurements can be crucial for generating accurate cost estimates for labor and materials for the subject roof. In this regard, even small inaccuracies in a pitch determination can result in large errors in cost estimates in some roof configurations, for example large and complex roofs. Therefore, when information is desired for a physical asset such as a roof, it follows that the amount of data needed to satisfy this specific use case for which the data is needed can depend—that is, be in the context of—the use case for the acquired roof data.

Even within a specific use case, the amount of data needed can vary. For example, to generate an accurate linear external measurement for the outer boundaries of roof structure, an orthogonal image, which by definition only incorporates 2D information, may be sufficient. However, to generate an accurate linear footprint of an internal roof element, such as a facet, 3D data from which pitch information can be derived will be needed. Further, the nature and quality of the 2D and 3D information derivable from images, as well as the processing capabilities available, can greatly affect the accuracy of the generated roof measurements.

Moreover, it is not just sensor data that can be useful to affect a desired goal for a data acquisition event for a roof structure of interest. An insurance, roofing, or other company may wish to understand the nature and characteristics of the age of a collection of roof structures in relation to the per capita income, demographics, or housing age in an area before sending out advertising to a neighborhood. While the roof structure information may be obtainable from acquirable sensor data, the income, demographic, and house age information will be derivable from existing database information. If the insurance, roofing or other company wishes to only market to persons having certain incomes and/or demographics and/or housing age, the company need not acquire sensor data about the collection of roof structures to allow generation of 2D and/or 3D information about the roofs (e.g., measurements, materials determination etc.) if the data about the area excludes them from the marketing guidelines.

Sensor data acquisition can also be deployed to capture other forms of information about physical assets or collections of physical assets other than roofs, for example, telecommunications infrastructure equipment. As would be appreciated, telecommunication companies provide the backbone of today's mobile communications across the globe. There is a need to constantly inspect and maintain these company's cellular transmission equipment, at least so that minor issues do not escalate into major ones that lead to expensive repairs and/or downtime. Safety and access are of the utmost concern in this process. But, regular inspection is a daunting challenge: in the USA alone, there are about 300,000 cellular towers.

The traditional method of tower inspection involves manually taking photographs and measurements. This previously required that skilled workers climb the towers, often in remote areas, making the process dangerous and inefficient. Currently, a number of providers utilize small, easily maneuverable UAVs that can navigate around a cellular tower. Accordingly, UAV cell tower inspection has largely replaced human climbers and other costly inspection methods such as aerial work platforms. These highly maneuverable UAVs can be configured to obtain image and other sensor data from virtually any angle or position of the cell towers to be a cost effective, efficient, and safe method to assess the condition of the tower, componentry thereon, as well as areas around the tower that are relevant to its operation.

In this regard, aerial inspection methods in use today can utilize a UAV that is controlled by a pilot positioned at ground level in a location proximate to the cellular tower or who is at a location away from the tower from which he operates the UAV via remote control. In each of these situations, the pilot typically moves the UAV around the cellular tower so as to obtain visibility to part or all of the tower, where the visibility is provided by the sensors configured on the UAV (e.g., image, thermal, RF, etc.) that is configured to transmit video of the cell tower to a screen for review by the pilot in real time. Notably, when acquiring information about the tower during a flight, the pilot is required to navigate the UAV and review the transmitted video simultaneously. It follows that even highly experienced UAV pilots can miss certain aspects of the cellular tower when performing two mentally and visually intensive processes in concert. This can especially be true if flying conditions are less than ideal, for example if there is high wind, as is common in some high altitude locations, or with weather or lighting issues that could adversely affect UAV flight behavior and/or image acquisition quality. In such situations, the pilot may need to expend more effort on flying the UAV, and the quality of the inspection, including any images acquired for analysis, may suffer.

Even with excellent flight conditions and a skilled pilot, notable aspects of the cellular tower may be missed in a real time visual inspection, especially if it is located in an area that might be proximate to an occlusion, or when the acquired sensor data does not align with information that can be observed visually during acquisition thereof, for example, network signal information and heat that may be generated from the equipment on the tower. In this regard, sensor information for the cellular tower is often acquired from a UAV flight, either on site or remotely, for review at a later time. Such after-the-fact image assessment will require a human to review the acquired sensor data to identify areas of concern or that are in need of repair etc. When acquiring the sensor data, the pilot may not notice in real time that a full view of a relevant aspect of the cell tower (e.g., mounted equipment, parts of the tower that may need maintenance) or the area proximate thereto (e.g., trees, obstructions) have not been adequately covered. For such after-the-fact imaging review, at the time the sensor data is reviewed by a human, the UAV would have already returned to base. If it is found that the sensor data previously obtained does not provide adequate coverage so as to allow the cellular tower to be suitably inspected, that is, there is not enough detail extractable from the acquired sensor data, the conclusions made by a human about the need for the cellular tower to be attended to may be partially or wholly invalid, or even not possible.

Moreover, in a typical cell tower inspection flight, as well as other UAV data capture events, a UAV device outfitted with sensors will gather hundreds, if not thousands, of images of the cell tower and the surrounding area. With a human operator managing the image acquisition, it is highly likely that too many images to reasonably review during acquisition may be generated, and those images will have to be reviewed by a human at a later time. More is not necessarily better when it comes to human review of images acquired from the site of a physical asset of interest because a human reviewer (or "supervisor) can easily become overwhelmed by too many images, particularly if he does not have a high level of training. Thus, human review of images acquired by a UAV as is done today is a tedious job and subject to human error, especially between different reviewers, thus leading to inconsistent results.

Other forms of infrastructure components, such as renewable energy (e.g., solar panel installations, wind generation devices, etc.), power generation and distribution equipment (e.g., transmission towers, distribution lines and poles, transformers, power lines, power poles), bridges, roads, etc. can also require the acquisition of 2D and/or 3D data derived from sensors when conducting inspection, repair, inventories, maintenance activities, performance assessments, condition assessments, business/financial activities etc. In such applications, the amount of sensor data needed in a particular physical asset use case and for a specific information application can vary in context.

Moreover, the information derivable from a sensor data acquisition event can be affected by the difficulty of obtaining a complete set of 2D and 3D information from a data acquisition event; that is, the goal set for a particular data acquisition exercise can be largely dependent on the characteristics of the information that can be obtained for one or collection of physical assets of interest generated in a particular situation. For example, it may be too expensive or time consuming to obtain a full damage assessment of an area after a devastating hurricane, with a goal for a post-storm inspection in context possibly being generation of a general understanding of the amount of downed power lines, as opposed to a precisely accurate assessment of the number of houses that have lost power. Processing limitations may also not allow a presented inquiry to be obtained under the circumstances of a data acquisition event.

The output desired in a particular situation may also vary in context. There remains a need for improvements in methods of deriving information processing, and the output thereof, for a physical asset or a collection of physical assets of interest, wherein at least some of the data is acquired from sensors. The present disclosure provides this, and other benefits.

SUMMARY

Aspects of the present disclosure are related to data acquisition, processing, and output generation for use in analysis of a physical asset or a collection of physical assets of interest. In one aspect, among others, a method comprises providing, by at least one computer, operator, or a user, a first user information goal comprising first user information for one or more of acquisition, processing, or output of data associated with a physical asset or collection of physical assets of interest, wherein at least part of the data comprises sensor-derived data; and evaluating, by the at least one computer, existing database information to determine whether all or part of the first user information goal can be substantially completed by retrieval and processing of an information set obtainable from existing database information. If the first user information goal can be substantially completed using the information set included in the existing database information: retrieving the information set from the existing database information; and either or both of (i) processing the information set to provide an output in the form of a report or notification to the user, operator or the at least one computer; or (II) storing the information set in a database for use as existing database information in a subsequent process. Or if the first user information goal cannot substantially be completed by retrieval and processing of the information set included in the existing database information: generating a first data acquisition plan configured to acquire data needed to substantially complete the first user information goal, wherein: at least some of the data acquirable by execution of the first data acquisition plan comprises sensor data associated with the physical asset or collection of physical assets of interest; and at least some data available in the existing database information: (i) is incorporated in the first data acquisition plan; or (ii) is included in information associated with execution of the first data acquisition plan.

In one or more aspects, the first data acquisition plan can be executed, and an output of the first data acquisition plan can be sensor data, and wherein the sensor data is processed to generate an information set, and wherein the information set is: incorporated in the form of a report or notification to the user, operator, or the at least one computer; or storing the user information in a database. The physical asset or collection of physical assets of interest can comprise one or more of: telecommunications infrastructure, electrical transmission equipment, mechanical equipment, all or part of the external areas of a building, all or part of the internal areas of a building, landscape components, electrical transmission components, solar panels, wind turbines, transportation infrastructure, vehicles, or oil and gas collection and processing equipment. The first user information goal can comprise one or more of: an inspection, an inventory, a performance assessment, a condition state assessment, building information management data generation, or life-cycle management information for the physical asset or collection of physical assets of interest.

In various aspects, the first data acquisition plan can be derived at least in part from one or more of: an identity of the physical asset or collection of physical assets of interest; a location of the physical asset or collection of physical assets of interest; rules associated with access to the physical asset or collection of physical assets of interest; a time period for completion of the first user information goal; a budget defined for completion of the first user information goal; a human skill set needed for completion of the first user information goal; a type of vehicle available to process the sensor data; an inventory of sensor types and configured needed for completion of the first user information goal; or a required accuracy percentage or confidence level required for all or part of the generated information.

In one or more aspects, the at least one computer or the user can optionally reject the first data acquisition plan. In response to rejecting the first data acquisition plan the method can further comprise: providing, by the at least one computer, operator, or the user, a second user information goal comprising second user information for one or more of acquisition, processing, or output of data associated with the physical asset or collection of physical assets of interest, wherein at least part of the data comprises sensor-derived data; and evaluating, by the at least one computer, a plurality of existing databases to determine whether all or part of the second user information goal can be substantially completed by retrieval and processing of data available in one or more existing database of the plurality of existing databases. If the second user information goal can be substantially completed from data available in the one or more existing databases: retrieving the second user information from the one or more plurality of existing databases; and (i) providing the second user information in the form of a report or notification to the user, operator, or the at least one computer; or (ii) storing the second user information in a database. Or if the second user information goal cannot substantially be completed by retrieval and processing of the data available in the one or more existing databases: generating a second data acquisition plan configured to acquire data needed to substantially complete the second user information goal, wherein: at least some of the data acquirable by execution of the second data acquisition plan comprises sensor data associated with the physical asset or collection of physical assets of interest; and at least some data available in the one or more existing databases: (i) is incorporated in the second data acquisition plan; or (ii) is included in user information associated with execution of the second data acquisition plan. One or more sensors can be configured to acquire RGB, thermal, or depth information.

In various aspects, the sensor data can be: retrieved from at least one existing database comprising archived sensor information; or generated from sensor data obtained from execution of the first data acquisition plan. The first data acquisition plan can comprise a flight plan and sensor operation instructions for an unmanned aerial vehicle (UAV) comprising one or more sensors configured to acquire at least some information associated with the physical asset or collection of physical assets of interest during execution of the first data acquisition plan. The method can further comprise executing the first data acquisition plan by generating sensor information associated with the physical asset or collection of physical assets of interest, wherein at least some 2D or 3D information about the physical asset or collection of physical assets are derivable from the generated sensor information.

In one or more aspects, the existing database information can be evaluated during or after execution of the first data acquisition plan, thereby optionally incorporating at least a portion of the existing database information with the first user information acquired during execution of the first data acquisition plan. The method can further comprise prior to or after generation of the first data acquisition plan: notifying the user, operator, or the at least one computer of an amount of deviation of the available existing database information from the first user information goal; presenting the user, operator, or the at least one computer with information about one or more of cost, time, and accuracy improvement required to achieve the first user information goal by execution of the first data acquisition plan; and providing the user, operator, or the at least one computer with an option to accept completion of the first user information goal by retrieval of the existing database information without execution of the first data acquisition plan. At least some of the existing database information can be operational with a machine learning process. The notification or report can be provided to the user, operator, or the at least one computer after execution of the first data acquisition plan. The notification or report can include the first user information associated with completion of the first user information goal. At least some first user information can include one or more of a percentage accuracy or a confidence level that the first user information substantially conforms to the first user information goal. The existing database information can be evaluated substantially in real time, thereby allowing the notification or report to be generated substantially in real-time. The form of the notification or report to be generated can be selected by the at least one computer, user, or operator prior to, during, or after the first user goal is provided.

In various aspects, the physical asset or collection of physical assets of interest can comprise telecommunications infrastructure in the form of one or more cellular towers; the first user information goal can be a cellular network tower inventory; and 3D information derivable from the existing database information can substantially complete the first user information goal without requiring either generation or execution of the first data acquisition plan. The physical asset or collection of physical assets of interest can comprise telecommunications infrastructure in the form of a cellular tower; the first user information goal can be an inventory of equipment of on the cellular tower; and information derivable from the existing database information may not substantially complete the first user information goal, thereby requiring generation and execution of the first data acquisition plan. The physical asset or collection of physical assets of interest can comprise telecommunications infrastructure in the form of one or more cellular towers; the first user information goal can be a current cellular network coverage assessment; and 3D information derivable from the existing database information may not substantially complete the first user information goal, thereby requiring generation and execution of the data acquisition plan. The physical asset or collection of physical assets of interest can comprise telecommunications infrastructure in the form of a plurality of antennas for deployment as a 5G network array; the first user information goal can be a placement plan for each of the plurality of antennas in a plurality of locations; and information derivable from the existing databases may not substantially complete the first user information goal, thereby requiring generation and execution of the data acquisition plan.

Additional advantages of the disclosure will be set forth in part in the description that follows, and in part will be apparent from the description, or may be learned by practice of the disclosure. The advantages of the disclosure will be realized and attained by means of the elements and combination particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
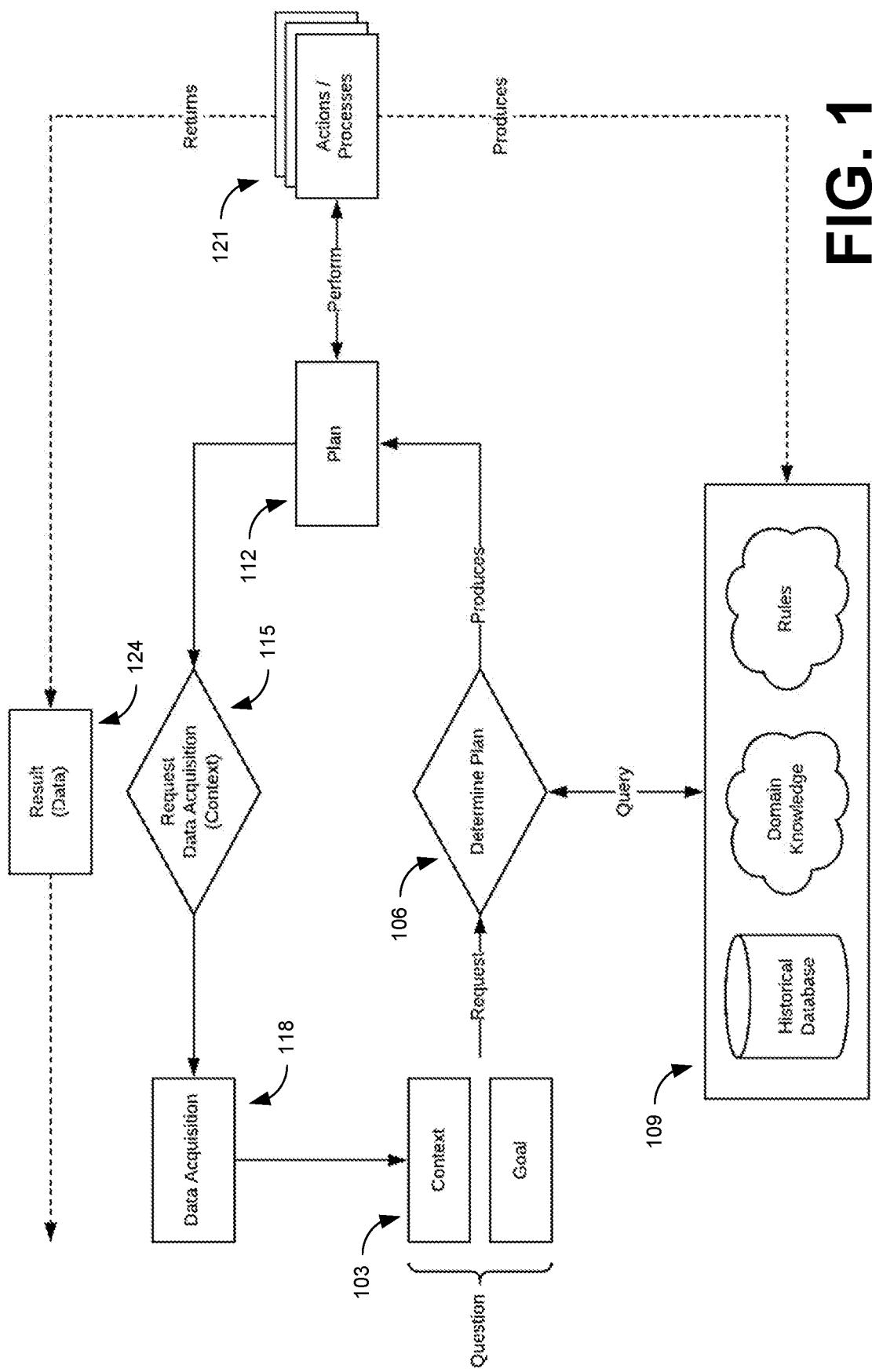
FIGS. 1 and 2 are flowcharts illustrating examples of processes for data acquisition, processing, and output generation for use in analysis of a physical asset or a collection of physical assets of interest, in accordance with various aspects of the present disclosure.

While several implementations may be described in connection with the included drawings, there is no intent to limit the disclosure to the implementations disclosed herein. To the contrary, the intent is to cover all alternatives, modifications, and equivalents.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

The term "about" is meant to account for variations due to experimental error. All measurements or numbers are implicitly understood to be modified by the word about, even if the measurement or number is not explicitly modified by the word about.

As used herein, a "physical asset of interest" includes, but is not limited to, cell towers, mechanical equipment, buildings, all or parts (e.g., internal or external) of a building (e.g., doors, windows, walls, roofing, stairs, plumbing/piping, electrical equipment, flooring material, decorative aspects), components on parts of buildings (e.g., mechanical equipment/electrical/plumbing components on commercial roofs, decking components on commercial roofs, shingles/facia etc. on residential roofs), structural components of buildings (concrete slabs, columns landscape components (e.g., trees, shrubs, driveways, water features, pools, parking lots, vegetation), telecommunications infrastructure (e.g., cellular towers, antenna arrays, fiber optic transmission lines, etc.) electrical transmission equipment or components (e.g., electrical transmission towers and substations, distribution lines and poles, transformers, power lines, power poles, insulators, switches, arrestors, generators, solar panels/components mounted on roofs, wind turbines, solar farms, radio frequency propagations), transportation infrastructure (e.g., roads, bridges, ground stockpiles), municipal infrastructure, vehicles (e.g., cars, vans, ships, tankers, trucks, airplanes, railcars, buses etc), oil and gas collection and processing equipment (e.g., land/sea drill rigs, pipelines, pumpjacks, compressors, dehydrators, well pads, gas clouds), internal building components (e.g., factory equipment, storage racks, floor layouts, internal doors, furniture, wall fixtures, bathroom fixtures, kitchen fixtures).

A "collection of physical assets of interest can comprise a plurality of the same physical assets (e.g., several antennas that collectively comprise a 5G antenna array on a commercial roof), or a plurality of different physical assets (e.g., a commercial roof having different mechanical and electrical equipment).

In some implementations herein, a "cellular signal transmission structure," also called a "cellular tower" or a "cell tower" herein, is a structure build on a parcel of land or that is erected on a building that is designed to accommodate a wireless tenant. These wireless tenants (e.g., Sprint, AT&T, etc.) utilize cellular signal transmission structures to deploy various technologies to a subscriber base, such as telephony, mobile data, television, and radio. As used herein, a cellular signal transmission structure can include all or part of:

Cellular towers: including monopole towers, lattice or self-support towers, guyed towers, concealed/Stealth®, and broadcast towers.

Cell site: an area within a wireless service provider network that can be serviced by an antenna array. There can be multiple cell sites (and multiple tenants) on any one given tower (or rooftop). A cell site typically includes a large number of components, each of which contribute to the functionality thereof. These components can include:
Cell panels
Dipole antenna
Grid dish/paraflector
Horn dish
High performance (drum) dish
Radome (RAD")/parabolic
satellite dish
global positioning system (GPS) antenna
omni-directional (omni) antenna
Yagi
RRU/RRH/ODU/DAP—radio Antenna array: a platform where a tenant mounts antennas, which provides signal transmission and reception to mobile devices within a specific area. Antenna arrays are frequently associated with the deployment of the Fifth Generation ("5G" cellular network. The number of antennas (typically 3-18) can be based on several factors, including the number of tenant (e.g., wireless carriers); the type (voice or data) and volume of transmission; the technology being used (e.g., CDMA, GSM, LTE, Wimax), and the frequency of spectrum (in MgH) utilized.

Microwave dish: a large round antenna, which is used for a specific type of transmission, and also commonly used for backhaul.

As used herein, a "scene" is a location that can incorporate at least one physical asset of interest, as well as elements, components, features, etc. proximate thereto that might be associated with the positioning, operation, etc. of the asset(s), wherein all or part of the scene may be included in the acquired sensor data for processing according to the methodology herein. A physical asset of interest may comprise componentry associated therewith that are, either individually or in conjunction with other components, of interest for inspection, inventory assessment, performance or condition assessment, etc.

"Inspection level detail" is information derived from sensor information comprising at least some 2D and/or 3D data. The provided sensor information can be generated from the physical asset(s) of interest in a data acquisition plan as set out herein, obtained from existing database information, or both. The sensor information can include images and other sensor generated information (e.g., RF information, thermal information, topographical information, temperature information, etc.). In some cases, the inspection level detail generated herein can have a resolution or degree of detail substantially equating to the same level that can be seen by a human inspector onsite in person. Such inspection level detail provides suitable detail to allow the determination of, for example, whether maintenance or repair of a physical asset of interest, for example, a cellular signal transmission structure, being inspected as the user information goal is needed now or at some time in the future. For example, inspection level detail can provide information from the images acquired by a UAV to provide measurements to within 6" of the actual tower height, or that provides resolution within 1" of the actual structure component (e.g., a RAD) height and width, and within 2" of actual structure component elevation above a base plane.

Inspection level detail can be associated with the sensor data relative to a physical asset(s) of interest with a user information goal of generating appropriately detailed information of the asset(s) and associated areas from the acquired images. For instance, in a cell tower, inspection level detail can mean that the information derived from the acquired images would first enable identification of a relevant object or component on a tower structure as one or more foundation, antenna, dish, transmission line, waveguide bridge, grounding, conduit, lighting, paint, galvanizing, fencing, vegetation, concrete, meter bank, labeling, ground components, ground transformer, H-frames, ground shelter, anchor bolt, or something other. Once identified via imaging analytics and machine learning, as discussed further herein, derived information for that object could then generate an identification of the presence or absence of damage, for example, such as corrosion, rust, erosion, a short hazard, drainage issues, discoloration, deformation, and the like. Inspection level detail can vary in context according to the type of inspection being undertaken and the physical asset or collection of physical assets of interest. For example, if the inspection being conducted is of the area around a potential location for a physical asset of interest to determine whether that location is suitable for an installation, the inspection would be directed toward the condition of the subject area in relation to the engineering requirements of the subject cell site. The information acquired in such a situation would likely be very different from information needed to inspect an already-installed physical asset, for example. Inspection level detail, therefore generates information about a physical asset or collection of physical assets of interest and areas proximate thereto that provides a user with actionable insights regarding, condition, maintenance, repair etc. Moreover, such information can also be used to improve subsequent inspection events by incorporation of such information into training sets for machine learning. Yet further, the information can be used to generate reports, for lifecycle management, in contract/payment, etc.

Inventory means a count, listing, etc. of features, elements, components that are present on a physical asset of interest or on individual physical assets that are in a collection of physical assets of interest or the physical assets of interest in a collection.

Performance assessment characterizes attributes of a physical asset or collection of physical assets informs a user, owner, operator, manager, regulator, etc. associated with how well the asset(s) of interest carries out its intended functions. Categories of performance can comprise quality (e.g., how well the asset fulfils its intended functions), resource expenditures (e.g, energy usage, water usage, etc.), and workload capacity (e.g., the amount of work the physical asset is capable of doing). The performance of a physical asset or collection of physical assets of interest can be influenced by the response of the asset(s) to an external load or condition. Physical asset performance assessment can be relevant in design, asset services engineering, regulation, compliance, asset management, etc.

Condition state of a physical asset or collection of physical assets relates to the appearance, quality, age, working order, remaining useful life, etc. A condition state relates to how the asset exists in a real-time context.

Lifecycle management means assessment of operational characteristics associated with a physical asset of interest, a collection of physical assets of interest, or components thereon from a first point, such as installation at a location, through use thereof by a user, to decommissioning of that asset or components thereon.

Building information management (BIM) is a digital representation of physical and functional characteristics of a facility, building, space, etc., which will necessarily incorporate information about objects present therein. A BIM is a shared knowledge resource for information about a facility forming a reliable basis for decisions during its life-cycle; as existing from earliest conception to demolition. BIM involves representing a design as combinations of "objects"—vague and undefined, generic or product-specific, solid shapes or void-space oriented (like the shape of a cone or more), that carry their geometry, relations and attributes. BIM design tools allow extraction of different views from a building model for drawing production and other uses. These different views can be made automatically consistent, being based on a single definition of each object instance. BIM software also endeavors to define objects parametrically; that is, the objects are defined as parameters and relations to other objects, so that if a related object is amended, dependent ones will automatically also change. For the professionals involved in a project, BIM enables a virtual information model to be handed from the architect or design team to the main contractor and subcontractors and then on to the owner/operator; each professional adds discipline-specific information to the single shared model. This seeks to reduce information losses that traditionally occurred when a new team takes "ownership" of the project and provides more extensive information to owners of complex structures.

Unless the context indicates otherwise, 2D and/or 3D data and sensor data can be used interchangeably to refer to information that is relevant to the methods and systems herein. As a non-limiting example of such context-based usage, a cellular tower can incorporate sensor data, such as RF data, that might be less relevant or even have no relevance for other physical assets, such as a commercial roof. Thus, the respective data acquisition plans for each of these physical assets will take into consideration the sensor data that is relevant to completion of a user information goal.

"Existing database information" means the existing corpus of relevant knowledge about a physical asset of interest, a collection of physical assets of interest, the scenes or locations in which the asset(s) are, or are likely to be, located. Existing database information can also include rules associated with the assets, operation of the sensor devices, or any other information. Such rules can be specific to the particular asset(s), or generally applicable to a class or type of asset(s). Existing database information can also include domain knowledge held by a user or the user's organization, where such domain knowledge can vary between users, organizations, and among different users in an organization. Data and information acquired during the operation of processes herein can become part of the corpus of relevant knowledge and, as such, can suitably become existing database knowledge after completion of the steps associated with a user information goal.

In significant aspects, the present disclosure provides systems and methods for the visualization, inventorying/identification of physical assets, lifecycle management, BIM, performance assessment, condition state monitoring, and/or performance of engineering activities related to a physical asset or a collection of physical assets of interest. As described herein, such activities can comprise a user information goal that forms a basis of the systems and processes herein.

In broad constructs, the systems and methods of the present disclosure comprise identification or selection of a user information goal associated with a physical asset or a collection of physical assets of interest, wherein at least part of the information required to complete the user information goal comprises sensor information. The first user information goal is the reason for the data acquisition plan, processing plan, and output plan in the first order. For example, the user, which can be a person or, in some implementations, an automated system that provides results or information to a customer, operator, owner, contractor, service provider, vendor, etc., can seek information about a physical asset(s) of interest in a number of categories or types that might each be relevant in a particular situation. For example, a user might seek to obtain an inspection, measurements, maintenance information, inventory information etc. The system and methods herein are configurable to allow performance of all or substantially all of the database queries and information processing automatically in the completion of the first, or any other, user information goal. In this regard, the systems and processes are configured to perform comprehensive automated analyses and to determine at least one optimum data retrieval (if any), data acquisition, data processing, and output associated with completion of the user information goal(s). The operations hereof can be automatically optimized in one or more domains for each user information goal associated with one or more physical assets of interest, for example cost, time, performance, resources, hardware and software, data transfer, processing power, sensor type, etc.

The user information goal can be expansive and can comprise or be associated with one or more of quantitative inspections such that generates accurate measurements, geometry, topography etc., qualitative inspections such that generates measurements, geometry, topography etc. having relative accuracy, inventory management, health monitoring, damage assessments and condition state determination, condition state progression over time, deficiency identification, technical performance (e.g., coverage area by antenna or load bearing capacity of a building), serviceability, progress monitoring, as-built vs. as-designed discrepancies, engineering drawings or specifications, Building Information Modeling (BIM), preventive maintenance reports, repair cost estimation, life-cycle modeling or reports, Geographical Information System (GIS) reports, 2D/3D/4D/5D visualization, emergency/disaster simulations, emergency/disaster response guidelines, geometry/topology/semantics modeling, etc.

The present disclosure provides systems and methods can be used to generate a wide variety of information associated with a user information goal, including 2D and/or 3D information, about a physical asset or a collection of physical assets. The generated information can be obtained from either or both of existing database information—that is archived information, image libraries etc.—and information acquired via execution of a generated data acquisition plan for the purpose of completing a user information goal associated therewith. By way of explanation, the systems and methods herein can be described as "context aware" at least because at least some of the processes executed herein and the output generated therefrom substantially do not result from a predefined set of processing steps operational for every request for information about a physical asset of interest. Rather, an optimum combination of data collection and processing steps can suitably generate output relevant to the information requested—that is, the user information goal—for the one or more physical assets of interest can be generated by using a series of deterministic algorithms, heuristic algorithms, probabilistic algorithms, and/or machine learning models according to the given questions, inquiries, or requests, and existing constraints, such as sensor availability, budget or time limits, weather condition, physical asset location/height/accessibility, etc.

For example, a user can generate one or more questions or queries pertinent to a user information goal associated with the one or more physical asset of interest, where the questions or queries comprise information or data including, but not limited to a user information goal to be obtained, which can be associated with a business need, an output quality, output completeness, confidence in the output itself and/or the accuracy of the output, a priori information, thresholds, budget limits, time limits, or the like. The processes herein can depend on a number of factors such as the scope and content of the user information goal(s), the type and amount of available existing database information that can be referenced to complete all or part of a user information goal, the type and location of the physical asset(s) of interest, and the amount of detail or caliber/nature/characteristics information needed by the user for the physical asset(s) of interest, for example. One, some, or all of these, and other factors, may be relevant to substantially completing a user information goal, thus providing context-based systems that are modifiable according to the specific needs of the user in a particular use case where information about one or more physical assets of interest is to be generated.

In a first aspect, the systems and methods comprise providing, by a computer or a user, a user information goal, wherein the first user information goal is associated with a physical asset or a collection of physical assets of interest. At least part of the information provided or generated for completion of the user information goal includes 2D and 3D information derivable from sensor information that either or both already exists or that is generated for a particular purpose.

While the 2D and 3D information provided or generated according to the processes herein can typically be associated with the physical asset(s) of interest, in some implementations, the 2D and 3D information can be associated with other objects or components, where such other objects and components can have utility to enrich the information about the physical asset of interest. In this regard, and in a non-limiting example, if the physical asset of interest is an HVAC system on a commercial roof, 2D and/or 3D information associated with vertical elements on the roof can be generated to enrich information about the HVAC and associated locations, features, components, etc., such as by allowing confirmation of dimensions, condition state, performance assessment for the HVAC system itself.

A plurality of existing database information can be evaluated to determine whether all or part of the user information goal can substantially be completed by retrieving and/or processing of information available in one or more of the plurality of existing database information sources. If the user information goal can be substantially completed from information retrievable or derivable from the existing database information that is retrievable or derivable information about or in relation to the physical asset(s) of interest and associated elements, features, components, etc. can be provided to the user as a variety of output forms, as is described hereinafter in detail.

Such user information goal completion information can also be stored in a database for use in a later process to itself become part of an existing database information source, for example, to seed a machine learning library. If it can be determined that a particular type of user information goal can typically be satisfied from information retrievable or derivable from one or more existing database information sources, the machine learning library can be trained with that information for use in such subsequent processes.

As noted, in some implementations, a user information goal can be completed from evaluation of a plurality of existing database information. For example, an existing database in the form of an image library can include archived images of buildings, roofs, infrastructure, electrical transmission components etc. These libraries can include 2D and/or 3D information about the physical asset(s) of interest, or 2D and/or 3D information about the physical assets of interest can be derivable from such libraries. These libraries can also include information that, after retrieval and suitable processing thereof, may provide the 2D and/or 3D information needed to complete a user information goal. If a review of these available databases indicates that the first user information goal can substantially be completed using 2D and/or 3D information derivable from such existing database information, the first user information goal may be satisfied without needing to acquire additional 2D and/or 3D information from sensors deployed to according to a generated data acquisition plan.

For example, image libraries and databases incorporating 2D and/or 3D information derived from acquired image capture by a vehicle, such as for aerial and terrestrial-based capture, can be used herein. For example, the NearMap commercial database comprising structure images obtained via aerial image capture having 2D and 3D information incorporated therein can operate as existing database information that can be queried to provide information relevant to a user information goal. Still further, rich image libraries, such as Google Maps and Apple Maps® can be used to generate 2D and 3D information that can be used in the completion of a user information goal.

Available existing database information can also include information other than 2D and 3D information, for example, inventory information, engineering diagrams, GIS information, weather data, architectural and design information, cost reporting, parts listings, recall/service notifications, zoning information, tax records, property transfer records, semantic information, operational/performance information for the physical asset(s) of interest, operational/performance information for a class or type of physical asset, financial information, employee information, access information (e.g., "no fly" zones), ownership information, weather reports, and the like. Such existing database information can also be useful in the generation of the data acquisition plans and any output provided to the user or the computer, as discussed further herein.

If a first user information goal for a physical asset(s) of interest cannot substantially be completed from information derivable from the one or more existing database information sources, a data acquisition plan can be generated, with the data acquisition plan being configured to allow acquisition of sensor data about the physical asset(s) of interest, and with the plan configured to allow substantial completion the first user information goal upon execution thereof. In some aspects, substantial completion of the user information goal can incorporate information derived or obtained from one or more of the existing database information sources. The information derivable from the existing database information can also have utility in generating the data acquisition plan, as discussed hereinafter in further detail.

In some implementations, the data acquisition plan can be derived, at least in part, from a user generated workflow associated with one or more of: the identity of the physical asset or collection of physical assets of interest, the location of the physical asset or collection of physical assets of interest, a time period for completion of the first user information goal, a budget defined for completion of the first user information goal, a human skill set level needed for completion of the first user information goal, an inventory of sensor types needed for completion of the first user information goal, computer capability available to process the sensor data, the type of vehicle available to generate the sensor data, and the required accuracy percentage or confidence level required for all or part of the generated information among other things.

In some cases, the data acquisition plan generated for the completion of a first user information goal might be determined to be too expensive, time consuming, cumbersome etc. For example, the first user information goal may be to acquire accurate measurements of a residential roof, and it is determined that a flight plan generated to complete this first user information goal could not be completed for several weeks, but the user needs to obtain information about the roof in just a few days. In such a case, the user or the computer can optionally reject the generated data acquisition plan directed to the first goal of obtaining accurate measurements of the roof. Such optional rejection can be followed by generation of a second first user information goal with a review of available existing data. If the existing data cannot effectively allow completion of the second user information goal, a second data acquisition plan can be generated for execution from which at least some information about the roof structure of interest can be provided to the user.

At least some of the data generated from execution of the data acquisition plan comprises 2D and/or 3D information derived from sensor data generated from the physical asset(s) of interest. A data acquisition plan deployable to substantially complete a user information goal can be automatically generated from the context of the user information goal, processing characteristics to be used, and the nature and content of the information desired by the user. The generated data acquisition plan can incorporate relevant details about sensor types needed to complete the goal, such as by identifying the type of sensor information needed for the physical asset(s) of interest, and generating instructions associated with acquisition of the information in a data acquisition event. To this end, the data acquisition plan can include a data capture plan, such as a UAV capture plan (flight route, number of images acquired, sensor characteristics etc.) to be deployed to allow the user information goal to be successfully completed.

Some exemplary sensor types and associated sensor data characteristics acquirable from a data acquisition plan can be identified, where the sensor types and associated sensor data characteristics can be selected to allow the needed information about the physical asset or collection of physical assets of interest to be generated. The selected sensor types and data attainable therefrom can include, without limitation, satellite imagery, manned or unmanned aerial orthographic imagery, manned or unmanned aerial oblique imagery, drone, point and shoot RGB/thermal camera, RGB/thermal video camera, other thermal capture devices, camera phone, mobile camera, airborne LiDAR, terrestrial LiDAR, airborne laser scanner, terrestrial laser scanner, surveying instruments such as a Total Station, hand-held laser meter, measuring tape, etc. Configurations for the sensors from which the sensor data is captured can be in the form of devices comprising, but not limited to, digital cameras, smartphone cameras, tablet cameras, wearable cameras, video cameras, digital sensors, charge-coupled devices, and/or the like. LI DAR, and depth sensing cameras can also be used. When the sensor is configured for image data, the sensors can be configured to include known or determinable characteristics including, but not limited to, focal length, sensor size, aspect ratio, radial and other distortion terms, principal point offset, pixel pitch, alignment, and/or the like. Information associated with such determinable characteristics can be incorporated into acquired image metadata for use in the information derivable therefrom.

As indicated, at least some of the information associated with substantial completion of a user information goal for a physical asset or a collection of physical assets of interest comprises 2D and/or 3D information derived, at least in part, from sensor information. In some implementations, such 2D and/or 3D sensor information can comprise image information. Such image information can be acquired during an imaging event associated with a generated data acquisition plan. Methods of acquiring images from a single passive image capture device and processing of such images to generate 3D information therefrom are described in U.S. Pat. No. 9,886,774, the disclosure of which is incorporated herein in its entirety by this reference.

Yet further, 2D and/or 3D sensor data for an object of interest, here a physical asset of interest, can be generated from a variety of imaging devices using the processing methodology in U.S. Pat. No. 9,904,867 ("the '867 Patent), the disclosure of which is incorporated herein in its entirety by this reference. Methods to acquire images from which 2D and/or 3D image information include, for example, manned and unmanned aerial vehicles, manned and unmanned ground vehicles, and hand-held devices. To summarize that methodology, the approach is to connect object elements (e.g., features, parts, and contours) across views so as to form a unique and coherent model for an object category. Compact models of object categories are obtained by linking together diagnostic parts (i.e., canonical parts) of the objects from different viewing points. This linkage structure can be interpreted as a generalization scheme and will be based on linking the features from each pair of views, where those features are connected by a 2D translational relationship. The image feature location is denoted by X and appearance by Y following a Gaussian and multinomial distribution, respectively. Viewpoint parameters are also represented by T and S. Putting all the observable variables $\{X, Y, T, S\}$, latent/hidden variables $\{K, \pi\}$, and part parameters $\{\theta, \eta, \alpha\}$ together, the joint probability function of the model is $$P(X,Y,T,S,K,\pi)=P(T) \cdot P(\pi|\alpha_T) \cdot P(S) \cdot \Pi_n^N \{P(x_n|\hat{\theta},K_n,T,S,A) \cdot P(y_n|\eta,K_n,T,S,A) \cdot P(K_n|\pi)\}$$

It should to be mentioned that computing the exact marginal distribution is intractable. Hence, the learning problem is formulated as an optimization problem and solved using a variational expectation maximization algorithm.

Machine learning-based object identification, segmentation, and/or labeling algorithms can be used to identify the 2D/3D boundaries, geometry, type and health of one or a collection physical assets of interest so that it can be replaced by an physical asset or elements thereof with corresponding semantic data in from an existing model library of a subject physical asset of interest, such as, for example, by providing recognition of components and identification of aspects on or associated with a physical asset. In this regard, Deep Convolutional Neural Networks (DCNNs) can be used to assign a label to one or more portions of an image (e.g., bounding box, region enclosed by a contour, or a set of pixels creating a regular or irregular shape) that include a given physical asset of interest, a collection of the physical assets of interest, or components or features on or relevant to the asset(s). An object mask can also indicate which portions of the image include the asset(s). A directed graph can be used to build the neural networks. Each unit can be represented by a node labeled according to its output and the units are interconnected by directed edges. Once the multiple bounded views or enclosed free-shape regions and directed graphs are built, a model can be used to assign labels based on resemblance and statistics. Labeling can be completed as a product of an iterative process involving the object classification or segmentation using visual and spatial data features and 3D surface generation. The iterative process can be attributed to the fact that state-of-the-art libraries such as TensorFlow only accept a bounding box in an image and hence are incapable of handling multiple bounded views. The inventive iterative process may run the model on each bounded view. The outcome can be validated and merged based on the semantic labels given to the objects and available templates in the database. As a result, the output can progress from an abstract definition of the physical asset(s) of interest to an output that provides a definition that more closely conforms to the asset(s) in real-life.

While imaging information is typically generated from sensor data acquisitions associated with physical assets such as those described herein, in some use cases, non-image data may be acquired for review. For example, when assessing network coverage for a cellular tower, radio-frequency (RF) data will be relevant. When assessing whether a building envelope is energy efficient, a thermal/heat sensor will be relevant. In each of these sensor applications, data generated therefrom can comprise at least some of the data obtainable from the generated data acquisition plan, if applicable to complete a user information goal. In this regard, sensors identified for use in the data acquisition plan directed toward completion of the user information goal can further include, without limitation, RF sensors, chemical sensors, sound sensors, spectrometers, magnetometers, radiometers, wind sensors, ambient light sensors, barometers, temperature sensors, thermal imagers, range sensors, and/or other sensors), and so on. In implementations, the selected sensors are intended to capture real-world information describing the physical asset(s) of interest and the asset(s) environment to provide one or more of structure and/or the structure environment, for example, at least some 2D and/or 3D information derivable from optical images, heat information, radiation information, chemical emissions, range information, multi-spectral information, etc.

The operational plan to complete a user information goal for a physical asset(s) or collection of physical assets of interest can also incorporate instructions associated with an efficient data processing pipeline/flowchart that can extract an enhanced level of information, including 2D and 3D sensor information, from both acquired data, as well as available existing database sources, so as to satisfy the user information goal, where such user information goal can be completed substantially without human intervention, that is, automatically. If human intervention is used, such human supervision is optimally conducted for confirming the accuracy of the generated user information, in context. If accuracy is found to need improvement, such human supervision insights can be included in subsequent operations. As machine learning processes are trained and libraries are populated for each context of user information goal and physical(s) assets of interest, it is expected that an amount of human supervision, if such is needed at all, will decrease over time.

Information relevant to image capture that is acquirable either from existing database information and/or acquired by sensors for a purpose of completing a user information goal associated with the physical asset(s) of interest or areas proximal thereto can include, for example:

information about the address of the physical asset
geographic location of the ground targets, where the image are taken, all or part of the asset structure (e.g., X, Y, Z coordinates, latitude/longitude/altitude coordinates),
identity of the physical asset, owner or supplier of the information order, owner/tenant of the property that the property sits on, owner of the physical asset, owner of the hosted or mounted components etc.)
time and date of data acquisition
surrounding structures, vegetation, wildlife, elevations of the ground, etc.
vehicle speed during travel
weather conditions during data acquisition (e.g., both existing database information and current data acquisition)
the presence or absence of sensor data (e.g., image) overlap and the amount thereof
the angle of sensor data (e.g., image) capture in relation to an identified/desired area(s) or features of a physical asset(s) being for which sensor data is being acquired
SSD distance (as such term is defined hereinafter)
angle of triangulation between images
re-projection error and accuracy (or lack thereof) of 3D reconstruction or image alignment
confidence level in extracted geometrical, topological, and semantic data
deviation or discrepancies with respect to a priori information available for the given structure and locations proximate thereto
re-projection error with respect to ground control points
accuracy and confidence level for ground control points
sensor resolution and/or lens distortion
GPS resolution and noise level thereof
texture type and level
image illumination level
image noise and blurriness
existence of occluded regions (as discussed in more detail herein)
image coverage for occluded regions (as discussed in more detail hereinafter)
density of the 3D representation of the scene (e.g., density of the point cloud)
number or interval of acquired sensor observations during the image capture event such as number or interval of images or number or interval of GPS readings or number or interval of IMU ("inertial measurement unit") readings
identity of automated flight software used for the UAV/MAV to identify proprietary flight patterns
image capture settings (e.g., aperture, shutter speed, ISO, time-lapse, FPS for video data)
accuracy of GPS information, as indicated by type/model/manufacturer of GPS sensor
use of stability sensors or optical image stabilization on imaging device and/or UAV/MAV during sensor data capture
characteristics of sensors (e.g., high or low quality) as indicated by type/model/manufacturer of imaging device (smartphone, camera) or UAV/MAV, and
viewing angle, defined as the angle that a ray emanating from the sensor center intersects with the target surface. The ideal case is a ray that intersects the surface at 90 degrees angle because that is when the image is formed the best in the pinhole camera model.

In accordance with the inspection context of the present disclosure, one or more features or components of a physical asset(s) of interest can be substantially automatically recognized from the acquired sensor data. In this regard, the systems and methods of the present disclosure can automatically extract and identify componentry present in the images and provide geometrical, topological, and semantic identification thereto. In some aspects, such recognized features can be those that are pertinent to damage, maintenance, and/or the functionality of a physical asset of interest.

Referring again to the evaluation of existing database information, upon identification of the user information goal associated with the physical asset or collection of physical assets of interest, existing database information associated with the user information goal can be queried to determine whether information pertinent to implementation or completion of the user information goal already exists. Such existing information can comprise 2D and/or 3D information derived from images or can be other forms of information that may be useful to complete the user information goal, as discussed elsewhere herein. If existing 2D and/or 3D information pertinent to completing the user information goal is identified as retrievable for use, that available information can be utilized to provide all or part of the information needed. In other words, if the user information goal associated with the physical asset or collection of physical assets of interest can be generated from existing database information, the user information goal can be completed exclusively from evaluation of such database information substantially without the need to acquire additional data from execution of a data acquisition plan. For example, a user may have a goal of identifying the number of cell towers, or other types of physical assets of interest, present in a specific geographic area. If existing image libraries incorporate 2D and/or 3D data that can be evaluated to automatically extract such information—which would be derived, at least in part, as 2D and/or 3D information—the user information goal can be completed from that available information. A report or notification that the user information goal has been completed etc. can be generated that includes the information relevant to the goal, including information about the accuracy of the reported data, confidence thereof, etc.

The incorporation of a contextual inquiry in the generation of information useful for a physical asset(s) of interest in which the evaluation and retrieval of relevant content of existing database information that can suitably be deployed before generation and deployment of a data acquisition plan to fully or partially complete a user information goal is an improvement over prior art processes. To this end, by first evaluating available database information to determine whether an identified user information goal can be attained without the need to acquire additional information via deployment of sensors to a location where sensor information can be obtained about a physical asset of interest, a user can be provided with the desired physical asset information quickly, such as in real-time or substantially in real-time after the user information goal is provided. The use of existing database information to complete a user information goal can also reduce the cost of generating such information.

Existing database information that may be useful in generating and enriching the notifications or reports provided to the user about the information goal, as well as to inform and enrich the data acquisition plan. Such available existing database information can be used herein to provide context, richness, and improved accuracy in relation to the information generated from the systems and methods of the disclosure, as is set out in one or more examples.

For example, existing database information can be used in data acquisition plans directed to completing an identified user information goal, such as by using government information about physical asset ownership information to identify assets owned by an entity, where such ownership information can be used to generate a data acquisition plan for a collection of physical assets owned by an entity. Existing database information can also be incorporated to seed machine learning libraries that can be deployed to provide information relevant to affecting a user information goal, such as whether the user information goal can be achieved in context.

As a further example, historical performance information indicating that a type of mechanical equipment often present on a commercial roof is often subject to failure can be incorporated in a machine learning library that is used to generate flight instructions for a UAV image capture for a commercial roof inspection as the user information goal because this type of roof can be expected to include the potentially problematic mechanical equipment. In this case, the context of a commercial roof as the physical asset of interest provides an indication that a data acquisition plan associated with such inspection should be conducted to not only identify whether the subject mechanical equipment is present on the roof, but also, if so, the sensor data associated with the mechanical equipment can be obtained in sufficient detail to be able to extract the necessary information to determine whether the piece of equipment may need repair. In this regard, the existing database information relevant to the known presence of such equipment on the roof can enrich and inform the sensor data acquired during a data acquisition event given the context of a commercial roof inspection.

A user information goal may be to seek highly detailed information about a physical asset of interest, where such desired goal may require extensive imaging, manpower, and/or sensor data processing capabilities. Nonetheless, such desired detailed information can be difficult or impossible to generate due to the user's defined budget and/or available time limits, accessibility to a human operator, type of equipment available for deployment vs. that which is needed to affect the stated goal, etc. When a user identifies an information goal, existing database information can be queried to determine whether the defined goal can be met with such information in the first order. For example, a detailed aerial inspection of a cell tower may require a highly skilled UAV operator who can safely and competently generate sensor data for the relevant parts of the cell tower. The cost of such manpower could exceed the budget of the user, or a capable operator may be on leave such that the desired goal cannot be met. If the defined user information goal can be partially met, or the information derivable from existing database information or acquirable from a less skilled UAV operator may have a lower accuracy or confidence level, the user can be provided with such information to allow him to select the less information-rich option. For example, the user can be provided with information about prior UAV inspection operations conducted with a lower budget or a UAV operator having less training, along with an assessment of whether the intended goal can be met and how close or far the accuracy or quality of the resulting output will be relative to the user information goal.

Image processing techniques can be applied to at least one aerial image to identify relevant boundaries of the physical asset(s) of interest and also componentry or other features associated therewith that may have visible size that may create full or partial occlusions in the acquired images. For example, a height from the surface of a physical asset(s) of interest can be applied to the boundaries or componentry. An antenna-type component on a cell tower and/or other structural elements could occlude transmission or power equipment attached to the antenna-type components or the tower section behind the antennae. Wires could also be occluded by antennae or other structural elements. Such occlusions can be detected and the missing areas filled in (which can be automatically assigned via application of a training set as discussed elsewhere herein), so as to allow generation of a completed 3D volume of the asset associated with each area having occluded areas. This information can then be incorporated into sensor data acquisition instructions to generate a capture plan having an optimum pattern according to the boundaries of the cellular tower transmission structure, location of the components, occlusion, SSD, etc.

Damage detection, condition assessment, functionality assessment, identification, labeling, measurement, orientation, and classification can be relevant elements in inspection for health monitoring/assessment of a physical asset(s) of interest. The present disclosure can enable the automatic or substantially automatic detection of information relevant to these and other of possible failure points in a physical asset(s) early enough to prevent extensive damage from occurring. Moreover, the methodology herein can result in improvements over time by generation of training data associated with various condition or damage categories or types.

In a further implementation, generated training data can be applied to identify the existence of actual or potential damage or other characteristics of interest in a physical asset(s) using only 2D image data. Such damage detection can be used, for example, to measure differences in 2D images of a physical asset(s) that have been taken at different times. At a first data acquisition event for a physical asset(s), 2D images can be georeferenced. At a second, or subsequent, image acquisition event, those same pixels can be automatically analyzed to identify differences.

In further implementations, the systems and methods herein can provide information about one or more of the existing, current, or future conditions or states of a physical asset or collection of physical assets of interest. Such existing, current, or future condition states can comprise the identified user information goal. The condition or state of a physical asset of interest can be provided in the form or context of one or a combination of the following categories: inventory management, inspection, health monitoring, assessment, geometry reports, damage assessment and progression over time, deficiency identification, technical performance (e.g., coverage area by antenna or load bearing capacity of a building), serviceability, progress monitoring, as-built vs. as-designed discrepancies, engineering drawings or specifications, BIM, preventive maintenance reports, repair cost estimation, life-cycle modeling or reports, Geographical Information System (GIS) reports, 2D/3D/4D/5D visualization, emergency/disaster simulations, emergency/disaster response guidelines, geometry/topology/semantics modeling, etc. A user can directly request one or a combination of information sets associated with these conditions or states by providing an information goal for processing according to the disclosure herein.

Yet further, the present disclosure can be used to determine change in a physical asset(s) or location proximate thereto over time. The condition of a physical asset(s) or a location can change over time. For example, a commercial roof structure and/or any mechanical or other equipment present thereon, can undergo changes (e.g., deterioration, aging, water ponding, etc.) over time. To monitor such changes, the physical asset of interest—here a commercial roof and/or the components or equipment thereon can be imaged in a time series to updating of its condition profile to identify the changes as a function of time. This aspect of the disclosure thus generates a "4D" health monitoring system that can provide decision makers with visibility to the commercial roof structure condition at discrete times. Cost information can be added to provide "5D" information. From a preventive maintenance perspective, this also provides owners, managers, and service providers with data that could be used to determine the optimum time to take preventive actions or repairs in order to maximize the life and service condition of the physical asset to reduce or even prevent failures thereof that can affect the condition or performance of the asset over time.

Still further, data capture, such as periodic image acquisition by an aerial vehicle can generate sensor data in the form of images at different times of the year. Due to the orientation of the sun relative to the physical asset(s) of interest, snow cover, tree cover etc., such periodic image capture can reduce the quality of sensor data that is generated from individual data acquisition events. The systems and methods herein can be configured to merge sensor data acquired at different times to generate a full and complete set of 2D and/or 3D data to allow the generation of accurate measurements of the asset(s) etc. As such, in implementations, the systems and methods herein can comprise sensor data acquired in a plurality of data capture events, wherein the sensor data acquired over time can be collected to provide a single set of data for the asset(s) of interest, for example, a 2D representation and/or 3D reconstruction, measurements, counts, topography etc.

Two change detection methodologies can be used: 2D change detection between sensor data and 3D change detection between point clouds. Image processing techniques as discussed elsewhere herein that suitably compare two or a plurality of images together and highlights the differences and/or track the severity and size change over time can be used. Since these acquired images are geo-registered during a data acquisition event for a physical asset(s) of interest, corresponding pixels in every image acquired in a subsequent image acquisition event will represent the same spatial point in real life. As a result, automatic change detection for the physical asset(s) of interest can be provided while accounting for illumination and noise changes between images taken at different times; this can accurately report differences in the for the physical asset(s) of interest or the locations proximate thereto over time. Information is also provided for geometrical, topological, and semantic information relevant to the over time. The data acquisition events can be taken 3, 6, 12 months or more apart or at any other time periods of interest. Alternatively, a subsequent data acquisition event can be taken after storm or heavy winds or an event or disaster, such as a hurricane, earthquake, fire or the like, to assess damage via the methodology described herein. Such detected change information can be incorporated in existing database information for use to predict, and possibly under take preventative action directed toward reducing damage occurring in later disasters.

Identifying and segmenting visual signs of damage derivable from the acquired sensor data can be well-suited for use with a machine learning engine that incorporates relevant information about damage pertinent to a physical asset(s) of interest. As would be recognized, the training model can be actively updated and fine-tuned in its prediction parameters according to new data generated from acquired image data, as well as from information of technicians or other persons who observe and collect information at a physical asset(s) of interest location. Geometric clues such as deviation from a flat surface model could also augment the machine learning-based prediction for signs like sagging (e.g., on the metal structure, in a guyed wire or elsewhere) or bubbling (e.g., from paint failure, etc.).

In further aspects, the methodology herein can be used to not only detect/identify the existence and type of condition state, such as a signal of damage present on a physical asset(s) of interest but also to isolate the accurate boundaries of such actual or potential condition state in the acquired sensor data so the size and/location of the asset(s) can be measured with respect to a local/global coordinate system. Such boundary detection can be via machine learning techniques that can allow boundary detection for a physical asset(s) of interest to improve over time. Accurate boundary detection can allow an onsite inspector or repair contractor be able to find the exact location of a damage signal observable from the inspection information prior to performing an on-site visit, thus reducing the time and effort needed to perform a repair on the physical asset(s) of interest. For example, for a commercial roof, boundary detection for discoloration caused by water that is detectable from sensor data, such pre-determined boundary identification can allow an inspector to more easily identify a location on a large roof structure that may need attention.

In a further implementation, processing of the acquired sensor data can allow generation of inspection level detail for the physical asset(s) of interest and locations proximate thereto to be derived therefrom. Such processing can be substantially automatic and can be on: 1) the sensor data only; 2) point clouds only (such as from image-based reconstruction or from laser scanners or LiDAR that has color information attached to each point); or 3) both sensor data and point clouds. Suitable sensor data acquisition and processing methods are discussed in more detail hereinafter.

To obtain quantitatively valid inspection level detail for a physical asset(s) of interest, highly accurate image acquisitions from which complete 3D representations can be derived are preferable. For example, in cellular signal transmission structure inspection, certain key measurement information, such as geometric information of the structure and any associated components, can be highly relevant for derivation from the acquired sensor data. Such derived geometric information can include: antenna-type component height/width, antenna-type component id height center point to ground, antenna-type component azimuth/down/tilt/orientation, 3D geometry of individual antenna-type components, RF data, thermal data, tower height, geolocation of the antenna-type components and tower topology/physical configuration of the antenna-type components with respect to each other in an antenna array in a specific elevation on the tower, topology of antenna arrays on different elevations on a tower, geometry and topology of the antenna-type components and tower with respect to the topography of the ground surface and structures above ground in the serviceable area of the cell tower, and tower top to base foundation (where tower meets the metal of the feet), etc.

To complete an inspection level detail project as the user information goal, acquired images can be generated to provide 3D mapping of the physical asset(s) of interest and, if pertinent, objects proximate to the assets (e.g., trees, buildings, rooftops, etc.) and/or the location or scene in which the asset is located. Such a 3D mapping can generally be possible as long as minimum overlap between image data can be achieved. It has been determined that to obtain inspection level detail of a physical asset of interest, a number of additional factors can be significant. These include, but are not limited to, surface sample distance (SSD), view angle of the camera with respect to a surface being imaged, areas of occlusion, lens focus and exposure, etc.

SSD for a given surface is defined as the distance between pixel centers measured on that surface and is a function of camera distance to the surface and focal length of a sensor. Without being bound by theory, the inventors herein currently understand that SSD and occlusion operate as previously unrecognized factors in acquiring images of physical assets of interest that are suitable to generate inspection level detail, as well as to meet other user information goals, as set forth elsewhere herein. Further, multiple semantic data points can be pertinent to generating the requisite information needed for inspection level detail, such as discoloration, rusting, and missing components, equipment, features etc., that may only be identifiable from high resolution imagery, where "resolution" refers to the distance of the camera to a target surface divided by the focal length of the camera in pixels.

The present disclosure can also provide inspection level detail pertaining to a group or plurality of physical assets of interest that collectively make up all or part of a collection of physical assets that, for example, may be operational therebetween. The individual features of a first physical asset can be provided in inspection level detail, and in inspection level detail for each of the other physical assets in the collection, and further as a physical asset operates or functions in relation to each of the other physical assets in the collection. For example, information about a cellular signal transmitted from a single tower can be provided in inspection level detail, and information about how the cellular signals transmitted from each of a plurality of towers interact amongst each other and in the network can be provided to generate inspection level data for the overall performance of the network.

It has also been found that inspection level detail can be generated from imaging using an aerial vehicle configured with a sensor configured to acquire at least some image data obliquely. In this regard, the aerial vehicle can be navigated automatically or by assistance of a remotely located pilot (if a UAV) or onboard pilot (if a MAV) via instructions that allow images to be acquired that can suitably provide inspection level detail.

A particularly suitable implementation of the present disclosure is to position a UAV as close to the surface of physical asset of interest, for example, a cellular tower, as possible, as well as to acquire image data suitable to allow enough overlap so that a successful 3D reconstruction can be conducted substantially automatically to enable generation of inspection level detail that can provide identification of components, equipment, features, etc., as well as to provide substantially accurate measurements thereof, if appropriate. In another aspect, the UAV can be positioned so as to obtain the minimum number of images needed to generate inspection level detail. This at least can reduce the amount of processing power and/or time needed to generate the inspection level detail of the present disclosure.

Moreover, considering that a plurality of aspects of a physical asset of interest may be comprised of individual 3D objects (e.g., equipment, components, features, etc.) positioned on an associated surface(s) of an asset, occlusion of an opposite surface may be present. For example, numerous componentry may be mounted or positioned on a cell tower, where such componentry has dimensions in 3D space that generates at least some occluded areas in an imaging acquisition step. To better ensure that all aspects of a physical asset are imaged in a manner that allows inspection level detail or any other user information goal to be generated therefrom, the sensor data acquisition, such as image generation, can be conducted such that substantially all surfaces and corners are captured even in the presence of occluded or partially occluded areas.

The data acquisition plan generated for the physical asset of interest can incorporate instructions pertinent to such needed additional sensor data capture. In some implementations, information about difficult-to-image features of a physical asset(s) of interest can be derived from existing data generated for that same or similar physical asset(s). Yet further, information about such difficult to image areas can be included in a generated data acquisition plan for an asset via a machine learning process. In this regard, if it is known that the sun will be at a particular location at a time of year that data acquisition for an asset may be conducted, the data acquisition plan can incorporate sensor data capture that is operational at a time that the sun may be less likely to shade the location, for example, mid-day. Yet further, the sensor data capture instructions may direct the UAV to conduct an additional pass around the physical asset(s) to better ensure that the data acquisition event is suitable to provide the data characteristics needed to complete the user information goal for that data acquisition event. As can be inferred, the planning for sensor data capture of a specific physical asset or collection of physical assets of interest operates as a multi-objective optimization process with no evident global optimum solution. In other words, the design, operation, and output of each process is dependent on the context of the asset, user information goal, real-time aspects of the data collection, etc.

In a further implementation, a user can be provided with information that the accuracy or quality of the output data from a data acquisition event may not be of the nature and caliber desired. For example, in response to a user information goal, existing database information can be evaluated to reveal whether a feature of the location where the physical asset of interest will not allow imaging of a quality required to generate the desired goal.

If the user information goal is to inventory and identify equipment present on a commercial roof, machine learning processes can include a library of information about relevant types of equipment and componentry that might be present on a commercial roof (e.g., HVAC, drains, electrical etc.). Such library of information can be generated from existing database information generated from previous commercial roof inspections, or from other sources, such as those described in the '867 Patent, previously incorporated by reference. A data acquisition plan generated for the commercial roof inspection as a user information goal can incorporate image capture instructions that are configured to obtain the number of images taken from vantagepoints that can capture and provide the needed detail for commercial roof inspection. The number of images and vantagepoints from which the images are taken on the roof can be generated automatically from a library of information of prior image acquisition events that were successful in allowing the same (or a similar) user information goal to be completed or not.

To this end, a user may also desire to obtain information about the energy efficiency of the building envelope on which the commercial roof is affixed. The existing database information can be used to enrich and inform the generated data acquisition plan and processing thereof to better ensure that the desired information about the roof and building, and areas proximate thereto is generated therefrom. The plan can include sensor selection that allows thermal information to be generated for the building envelope. The user information goal can be associated with obtaining solar panel installation information for the commercial roof. The data acquisition plan can be enriched and informed by available existing data that provides information about the GPS location of the roof, and its position relative to the sun at various times during the year.

Prior to or during deployment of a data acquisition plan, existing database information can be evaluated to predict the ability of the plan to provide the information indicated by the user information goal, along with other pertinent information that can be useful in context, to allow successful completion of the user information goal. Such predictions can be utilized to confirm that the user information goal can still be achieved from the generated data acquisition plan and, if not, how the data acquisition plan can be modified allow the identified user information goal to be achieved. For example, if in a prior commercial roof inspection for the condition of an HVAC unit the image capture plan did not result in the generation of enough image overlap to obtain the sensor data needed to allow accurate identification of the size and location of the unit on the roof, the machine learning system can direct modification of the sensor data acquisition plan before or during deployment thereof to generate additional images of the HVAC unit and areas and/or object pertinent thereto.

Both existing and available real-time information can be used to modify the user information goal while the operational steps, such as image acquisition for the physical asset of interest, are underway. For example, if real-time weather information indicates that prevailing winds may cause a UAV to drift during an image acquisition event, and it is known that such drifting can make it difficult or impossible to obtain suitable image overlap and detail needed to obtain accurate roof measurements as desired by the user for an particular purpose, the capture plan instructions can be modified during flight to direct the UAV to acquire more images while at the location of the roof and/or to generate additional vantagepoints for the images. The real-time flight instructions can be generated using machine learning that can predict whether the user information goal can be affected given the context of the operations then currently underway.

Yet further, the output of the data acquisition plan execution can be assessed after evaluation, capture, and processing of existing and/or acquired data about the physical asset(s) of interest to determine whether the user information goal was met and, if not, what the reason(s) for that goal not being met. Such generated information can be included in subsequent processes, for example to seed machine learning processes to determine for those later processes whether a user information goal associated with that process can be attained. For example, the completion success or failure of an executed data acquisition plan can be incorporated in data acquisition plan generation for a later user information goal. A subsequent data acquisition plan associated with such analysis can thus be enriched and informed by such information that allows the data acquisition plan generation to be trained with information about past data acquisition results.

Image libraries and databases incorporating 2D and 3D information derived from acquired images can be used to enrich and inform the data acquisition plan generation. For example, if some image information is already available for a physical asset of interest, that available information could be used in completing the user information goal. For example, a 2D image of a roof may be available in existing database information. These image databases may also incorporate some oblique images of the roof, but the number of available oblique images may not be enough to allow accurate measurements of the roof to be generated. In the generation of a data acquisition plan configured to generate accurate measurements of that roof, the available image information can be considered. As such, the data acquisition plan can be configured to allow acquisition of fewer images than would otherwise be needed to generate accurate measurements of that roof. Similarly, image information that is not directly associated with the physical asset(s) of interest can be useful to enrich and inform a data acquisition plan. In this regard, if there are obstacles that need to be avoided as a UAV travels to the location of the physical asset(s) of interest and navigation information is derivable from available image libraries, such information can be incorporated in a data acquisition plan to better ensure that the vehicle can travel safely to, around, and back from a sensor data acquisition event.

In another non-limiting example, an inventory of a cellular tower could take into consideration images of that cellular tower that are already present in an image library. The available images may allow identification of some of the features or equipment mounted on the tower, whereas other areas may be occluded such that some of the equipment cannot be identified from the images. A data acquisition plan generated for that cellular tower can be configured to account for the information that is derivable from existing images, and instructions can be provided to generate more detailed image acquisition in locations where image data does not yet exist. The data acquisition plan may also incorporate sensor selection information if the user information goal includes generating information about the cellular tower network performance.

In addition to the sensor data acquisition plan, the processing of the acquired sensor data can be relevant in context. A processing plan can therefore be generated in some implementations. For example, if the user information goal includes the generation of real time results to be obtained during a data acquisition event, it may not be possible to provide fully enriched information, such as accurate measurements of the physical asset of interest. Such results may require more detailed sensor data to be acquired, as well as additional processing thereof. To this end, a sensor data processing event may comprise not generating a dense point cloud from the acquired data in real-time because of the amount of sensor data and processing capability needed may limit the ability to provide the user with his desired real-time detailed information. In a further example, if the user information goal includes the generation of real time results to be obtained during a sensor data acquisition event, it may not be possible to provide fully enriched information, such as incorporated semantic and other information for the physical asset of interest that would necessitate evaluation of existing database information and/or application of machine learning processes in order to complete the desired information goal. Still further, if the user information goal is to identify and count a set of objects without the need for accurate dimensions or object boundaries, the sensor data could be limited to a set of RGB imagery that are captured using a UAV. In this situation, the locational and directional metadata attached to each imagery would be sufficient processing to establish correspondences and satisfy the user information goal. Still further, if the image capture device used for sensor data acquisition is equipped with an on-board processing unit that allows running a Simultaneous Localization And Mapping (SLAM) algorithm, the amount of optimum overlap among captured imagery and the optimum time to capture an image can be calculated on-the-fly.

An output of the completion of a user information goal can be in the form of a report in a form that would inherently incorporate one or a combination of these features. For example, if the user information goal is a residential roof report, as disclosed in U.S. Pat. No. 8,824,454, for example, the disclosure of which is incorporated herein in its entirety by this reference. A report generated for the physical asset(s) of interest can also include one or more of a damage assessment, preventive maintenance reports, performance information, repair cost, inventory data, and replacement cost, maintenance plan information etc.

As noted, the definition of "physical asset of interest" is used expansively herein. Referring now to specific non-limiting examples for the systems and methods herein as applied to a variety of specific physical assets of interest, the following examples are provided.

As an example of the systems and methods herein, consider a user information goal of measuring the footprint of a building, where the building is the physical asset of interest. The user information goal can be obtaining the measurements having an accuracy level of ±100 sqft (a square). To complete this identified user information goal, the automated system can recommend obtaining an aerial orthographic image derived from a manned aerial imaging event, where the recommended image is available in an image library indexed by the location of the building and geographical region of interest. Operationally, this step might be followed by a recommendation to use a machine learning model that is trained to extract outer boundaries of a building/roof from the aerial RGB imagery obtained from the image library. The process might continue by conducting a quality assurance step that provides information about whether the user information goal of accurate measurements was generated, such as by generating a confidence level for the generated measurements or a percentage of accuracy in comparison to the real-life roof measurements. The generated building footprint measurements can be provided to the user in the form of a report that completes the user information goal of generating accurate measurements of the subject roof. Additional information can optionally be included with the report, such as labor and materials costs associated with repair or replacement of the subject roof.

In a further example, if a user information goal is to perform an inventory assessment and damage inspection on an electric power distribution line, the system could automatically review available databases to determine whether the inventory information has already been generated. In the context of this user information goal, a damage assessment is likely not to be available in existing database information. The system can recommend deploying a UAV equipped with a RGB camera and a thermal camera coupled with an airborne LiDAR as the sensors configurable to capture the data necessary to affect the user information goal. The data acquisition plan deployed to acquire the necessary inventory and damage assessment data might include flight plan instructions configured as a KML file that contains geographical coordinates and orientations of a series of locations that the UAV will need to fly to gather data. This data acquisition plan can be configured to allow the sensors on the UAV to generate a set of overlapping RGB, thermal, and depth images from which 2D and 3D information can be generated. The processing pipeline can further include a sensor fusion approach to process individual imagery, establish correspondence among imagery, overlay extracted intelligence from an image with a certain data type (i.e., RGB, thermal, or depth) on another image with the same or different data type, infer the location of utility poles, identify objects mounted on each utility pole, inspect each pole and its mounted objects looking for potential damages, deteriorations, or deficiencies, model each utility pole and its mounted objects in a CAD software, determine the connectivity among utility poles, etc. The generated sensor information and other available or acquired data pertinent to the user information goal of electric power distribution line inventory and damage assessment can be presented to the user in the form of a pdf report, CAD drawing, interactive web-based 3D visualization tool, spreadsheet, etc.

Again referring to the electric power distribution example, if the user information goal does not seek accurate measurements, but instead is directed toward an inventory management on an electric power distribution line, the system could automatically review existing databases to determine whether the inventory information has already been generated. If no such information can be found or the user information goal is to acquire the latest information for the subject physical asset—here the electrical power distribution line—the system can generate a sensor data acquisition plan that recommends deploying a UAV equipped with only a RGB camera configurable to acquire sensor data sufficient to complete this user information goal. The data acquisition plan deployed to acquire the necessary inventory sensor data might include flight plan instructions configured as a KML file that contains geographical coordinates and orientations of a series of locations that the UAV needs to fly and gather data. The processing pipeline in this scenario can utilize the RGB imagery and the metadata attached to each image (i.e., location and orientation of the camera from GPS and gimbal readings) in order to establish correspondence among imagery and identify/label objects mounted on each unique utility pole. Note that there is no need for thermal imagery or 3D point clouds in this scenario because the user information goal can be addressed without those data types. Ultimately, the generated sensor information and other available or acquired data pertinent to the user information goal of electric power distribution line inventory can be presented to the user in the form of a pdf report, CAD drawing, interactive web-based 3D visualization tool, spreadsheet, etc.

As another example, if a user information goal is to evaluate potential deficiencies and damages on a building envelope in conjunction with an engineering CAD drawing with a measurement accuracy of ±1 in. and global positioning accuracy of ±1 in., the system could automatically recommend using a UAV equipped with a RGB camera and a thermal camera as sensors for data capture and using a set of Ground Control Points (GCPs) or AeroPoints or a set of scale constraints on the ground to enable survey-grade accuracy. In such a specific user information goal, the existing database information will likely not incorporate relevant 2D and/or 3D information needed to satisfy the user information goal. However, contextual information about the building that may be useful to process the information or present the information to the user, location, owner, etc., can be derived for use from existing database information. The sensor data acquisition plan generated to complete the user information goal could include flight data capture plan instructions configured as a KML file that includes geographical coordinates and orientations of a series of locations that the drone needs to fly and gather data. It might also include the exact layout of the GCPs. The processing pipeline in this scenario can initially use a Structure from Motion (SfM) algorithm to calibrate the captured imagery and generate a sparse point cloud. The GCPs can then be automatically detected in each calibrated image and corresponding detections can be linked to calculate the 3D coordinates of each GCP based on the calibrated image parameters. The initial 3D reconstruction can then be optimized based on the calculated and ground-truth coordinates of the GCPs so that an optimized sparse point cloud with survey-grade accuracy can be achieved along with high accuracy calibration (i.e., intrinsic and extrinsic) parameters for each image. This can be followed by sequential steps to generate a dense point cloud, 3D mesh, and orthomosaic image. The thermal imagery can be overlaid on the output of the RGB imagery. Calibrated imagery and/or the 3D point cloud can be used to generate a 3D CAD model/drawing; this can be an automatic, a semi-automatic, or a manual process. The CAD model/drawing can include geometry, topology, and semantics of one or more objects/surfaces of interest in the scene. Each surface in the 3D CAD model/drawing can be inspected automatically, semi-automatically, or manually in terms of potential damages or deficiencies including but not limited to corrosion, wetted insulation, hail damage, missing shingles/bricks, water ponding, water leakage, damaged flashing, etc. The entire process can result in a survey-grade CAD model/drawing along with an inspection report that could be presented in the form of a pdf report, CAD file, interactive web-based 3D visualization tool, spreadsheet, etc.

As another example, if the goal is to generate an engineering drawing of a cell tower including all mounted equipment, wires, bolts, etc., and if a suitable engineering drawing has not already been generated for the cell tower of interest, the system can automatically recommend using a UAV equipped with a RGB camera for data capture and using a set of scale constraints on the ground to enable high accuracy measurements and object dimensions. The capture plan can include flight plan instructions in the form of a KML file that contains geographical coordinates and orientations of a series of locations that the drone needs to fly and gather data. This could be a combination of vertical and orbit patterns that would better provide multiple viewpoints to an object of interest in the scene, as well as an exact 3D layout of the scale constraints. The processing pipeline in this scenario can initially use a Structure from Motion (SFM) algorithm to calibrate the captured imagery and generate a sparse point cloud. The scale constraints can then be automatically detected in each calibrated image and corresponding detections are linked to calculate the 3D coordinates of each endpoint of each scale constraint based on the calibrated image parameters. Each endpoint of a scale constraint can be marked using a distinguishable pattern (such as a chessboard pattern, hourglass pattern, black and white squares, bullseye pattern, concentric circles, etc.) so that automatic algorithms can detect each marker and its center point with very high accuracy (i.e., sub-pixel accuracy detection in images). The disclosure herein can suitably utilize using Maximally Stable Extremal Regions (MSER) for detecting potential candidate regions for scale constraint endpoints and then filtering them according a canonical view representation and template matching with sub-pixel level adjustments. The initial 3D reconstruction can then be optimized based on the calculated and ground-truth length of the scale constraints so that an optimized sparse point cloud with high accuracy is achieved along with high accuracy calibration (i.e., intrinsic and extrinsic) parameters for each image. This can be followed by sequential steps to generate a dense point cloud, 3D mesh, and orthomosaic image.

Calibrated imagery and/or the 3D point cloud can be used to generate a 3D CAD model/drawing; this can be an automatic, a semi-automatic, or a manual process. The CAD model/drawing can include geometry, topology, and semantics of one or more objects of interest in the scene. The output could be presented in the form of a pdf report, CAD file, interactive web-based 3D visualization tool, spreadsheet, etc.

Continuing with the cell tower as the physical asset of interest, if a user information goal is to acquire general information about a specific cell tower, a first step to completing this goal can comprise evaluation of relevant existing database information that may incorporate information about the specific cell tower of interest, cell towers of the same type, the specific location of where the cell tower of interest is located, or locations that are similar to the cell tower of interest.

Such review of existing database sources can provide information relevant to questions such as: 1) whether all or some of the information requested by a user about the cell tower has previously been generated and stored for retrieval, such that the 2D, 3D and other information needed to complete the user information goal can be obtained from existing database information without generation of new data; 2) whether all or some of the information requested by the user can be obtained given the existing capabilities of the user and/or the service provider tasked with generating the information needed to complete the identified goal, for example, are the sensors and other equipment needed to generate the information needed to complete the user information goal are available for use at the time and locations needed; and 3) whether "just enough" information can be provided, such that the user information goal may not be fully completed, but the amount of information that can be provided is suitable for the use case in context. For example, if a user information goal is an inventory of equipment present on a specific cell tower for a specific wireless provider, and that cell tower has been inventoried previously using images acquired of the asset, a cell tower inventory query can be answered by evaluation of such existing data. If a user seeks as a goal an inventory of a cell tower that has not previously been examined, but another cell tower for that provider has previously been inventoried using images, the user can be provided with information that indicates that the cell tower of interest is likely to have the same equipment on it that is present on the previously inventoried cell tower for that same provider, but that such information may not be completely accurate. The user may nonetheless decide that such possibly inaccurate information is satisfactory in context. In other words, the information may be "just enough" to affect the identified goal of the user. The user can also modify his previously identified goal to match the identified output that can be generated in context.

Yet further, the user can also be provided with option of having an inventory performed for the specific cell tower of interest by acquisition of images and other sensor data in a data acquisition event conducted according to a data acquisition plan, and the existing database information for an already inventoried cell tower can be incorporated in capture plan instructions for an imaging event associated with the cell tower of interest. As would be appreciated, and as set out in U.S. patent application Ser. No. 16/440,735, previously incorporated by reference, such existing database information can improve data acquisition plans generated for use by human operators, as well as for automated flights.

Yet further, the user information goal for a physical asset of interest, for example, a cell tower, can be compared with the capabilities available to a user or operator to generate the output needed to affect the user information goal. For example, if a user seeks information about the condition of a network transmission component of a cell tower of interest, and a provider does not have access to UAVs or other equipment incorporating sensors having the capabilities to generate the desired information, the system can provide the user with information about the inability to generate that information and, optionally, to generate an alternative plan or source of information that can allow the identified goal to be affected. Still further, if the user information goal is to obtain close-up images of the components of a cell tower and associated 3D information, such as for generating accurate measurements or detailed condition information about the cell tower is the identified user information goal, but a UAV will not be likely to generate the desired output in the prevailing weather conditions, the user can be provided with information in this regard. Weather information pertinent to a current or upcoming UAV flight can be obtained from weather databases etc. Alternatively, a database of existing cell tower imaging events can be processed with pertinent existing weather databases to provide an assessment of whether the information goal for a current or planned cell tower imaging event will be likely to generate the desired information.

Data created by a user can also be relevant. For example, a database of contractors available to service a physical asset can be created by a service provider. Such a database can include information about the skills of each contractor, the areas in which they work, licensure information, certifications, etc. If an HVAC on a commercial roof is identified from sensor information as having a condition state that requires maintenance or repair, a report or notification can be provided to the user that includes a recommendation for a service provider that includes relevant criteria for generating a service call for a contractor that meets the needs and qualifications for the subject HVAC.

As would be appreciated, such information about the performance of a particular UAV type or brand, sensor type or brand under certain conditions can enhance the ability to obtain an identified goal, especially when the data acquisition needed to affect that goal may be influenced by conditions such as weather. Such potential UAV capabilities in relation to sensors, brands, and the like are set out in more detail in the '735 Application, previously incorporated by reference.

In some implementations, the generated data acquisition plan can include instructions to a user to direct him in sensor data capture using a mobile device. The incorporated '735 Application sets out such data capture events conducted by a user with a mobile device in more detail. Still further, the systems and methods herein can provide information about whether imaging or acquisition of other sensor data from a physical asset of interest via a data acquisition event will allow the desired 3D information needed to complete a user information goal to be obtained. For use cases for which imaging information is used to derive geometrically detailed—that is topographically rich—information that is used to inform upstream applications needing such data, a user can be informed of whether such information is likely to be obtained from an imaging event conducted for that purpose. As would be appreciated, such detailed geometric information is derived from image information that incorporates suitable 3D detail, such as can be generated in the processes of the '867 Patent, previously incorporated by reference.

For example, and as would be appreciated, when deploying 5G data capability in an environment, a plurality of 5G antennas and associated equipment will need to be placed in a plurality of locations suitable to generate the desired antenna network coverage in a location. Because high frequency waves can exhibit more difficulty traveling over distances and through objects, 5G network deployment is by small cell site technology with antenna placement as close as 500 feet apart. Many of these antennas may be placed on top of buildings and light poles. Such overall antenna coverage information and antenna placement can be generated by existing software solutions that define coverage capabilities of a specific individual antenna and antenna array as a function of elements such as population, terrain, building information, etc. Urban small cells are one of the most challenging scenarios for simulation of performance for 5G. Network densification, whether for increased capacity or to deal with millimeter wave propagation challenges, can lead to much more complex urban multipath conditions. From simulation software, an antenna placement plan can be generated prior to the deployment of operational capabilities directed toward installing these antennas in the identified locations.

In one implementation of the systems and methods of the present disclosure in relation to 5G network development and deployments, once a network coverage simulation plan for 5G antenna deployment in a location is generated from a software program, such as those provided by Altair Networks for example, a user information goal of confirming that the identified antenna placement plan can be completed as set out in the antenna locational deployment plan can be generated. In one aspect, such goal confirmation can comprise evaluation of existing database information to determine whether the buildings or other locations are suitable for deployment of the antennas as indicated in the placement plan. Such information can also include reviewing existing image databases to identify the buildings or other locations, as well as potentially pertinent information to antenna placement such as building owner, building use, building age, tenants, etc. Such available image databases can be evaluated to derive pertinent antenna placement information, such as features mounted on the roof that could cause RF interference (e.g., equipment etc.), obstructions that could block signals, elevations, and adjacent buildings information that could cause transmission difficulties. Machine learning processes can be deployed to predict antenna location placement that may be problematic at installation or during ongoing deployment of the network. Such available image information can allow the generation information about the ongoing success about a 5G antenna installation plan generated by an antenna simulation software process as confirmatory check before the effort is expended to generate the installation. Such confirmation can also reduce the amount of manpower needed to conduct an in person inspection of a 5G antenna installation plan.

A next step can be to define a data acquisition plan to obtain images of the locations where an antenna deployment is to be generated from which suitable 2D and/or 3D information can be derived from a sensor data acquisition event. Such actual images of the locations can be used to derive relevant information to assist in confirming an antenna deployment plan, as well as to assist in the installation thereof. Existing imaging databases can be queried to determine whether it will be possible to suitably deploy a UAV to the location of the physical asset of interest to generate the necessary images and, if so, whether the imaging event is likely to provide the needed type and quality of information about the location associated with the physical asset of interest or the physical asset of interest itself. For example, the location around the physical asset of interest may be access limited (e.g., a no-fly zone for drones), meaning that it will be difficult or impossible to generate the information necessary for placement of individual antennas needed to complete an antenna array for suitable coverage of a location. In other words, if a stated user information goal is to identify locations for individual antennas for a placement in a defined 5G antenna array, and database information is generated that a location pertinent to such antenna placement is associated with UAV (or other) access limitations, the user can be provided with information that the desired user information goal cannot be met, as well as to provide alternatives for placement from the acquired sensor data. Such access limitation information can be obtained by the querying of publicly available databases, from existing database information that indicated that previous UAV flights were ineffective due to identified access limitations, or from other available inputs. Machine learning processes can be deployed to predict the success or failure of an antenna array installation and deployment. Also, and as discussed previously, other information pertinent to a goal of successfully implementing a 5G antenna placement plan can be evaluated for an image acquisition event related thereto, such as weather information, UAV operator experience, UAV brand and imaging capabilities, etc.

Yet further, the information generated about a 5G antenna installation and deployment process can be used to seed existing 5G network antenna installation and deployment software. In this regard, sensor data information derived from the systems and processes herein can be used to improve the knowledge base used in these existing systems. Subsequent 5G network simulation outputs that incorporate the output of the systems and processes herein can be further evaluated by the systems and processes herein, thus creating a virtuous cycle of continuous or near-continuous improvement for the design, installation, and deployment of equipment to be used in 5G networks.

As noted, the user or system can be provided with information about the ability of the processes herein to complete the user information goal prior to execution of the data acquisition plan. Using the 5G antenna in an antenna array as the physical asset of interest, if a user desires information about the condition of a previously installed antenna, but the location where the antenna is installed is shaded during a part of the year, or even part of the day, a UAV image acquisition event intended to obtain detailed information about the antenna may not provide the needed information if the imaging is done at a time when the antenna is shaded. Existing database information pertinent to characteristics such as the shading, or lack thereof, of the area around the antenna can be provided to the user to generate a confidence level or accuracy assessment for the UAV imaging event in relation to the imaging event goal.

Features associated with a cellular signal transmission structure that can be relevant to the generation of inspection level detail for the cellular tower transmission structure and areas proximate thereto, as well as a collection or plurality of cellular signal transmission structures that make up all or part of a transmission network can include, but not limited to:

Componentry that requires measurement (e.g. tower, tower foundation, tower components etc.);

Current state knowledge about the tower and hosted components (structural and/or component damage) (rust, cracks, rust, discoloration, short hazards, deformation, etc.);

Calculation of EMF projection patterns (direction and signal strength of antennas);

Knowledge of the environment around the tower (proper drainage, non-encroaching vegetation, etc.);

Evaluation of actual or potential signal blockage (other manmade structures, vegetation, etc.);

Infrared surveying (e.g., identification of "hotspots") on power equipment (ground components, tower components);

Evaluation of transmitting patterns of the cell tower in 3D space to assess EMF health of the cell tower;

How a current cell tower condition compares to the as-designed engineering specifications;

How a current cellular tower condition compares to the as-built engineering specifications;

Serial numbers of ground and antenna components to include model types from visual labels and color coding of connectors to support antenna grouping;

How a cell tower condition compares to past condition of the same cell tower (change detection);

How a first cell tower condition compares to the current condition of a second cell tower;

To augment product or engineering database to improve inventory management, design, engineering, or maintenance schedules therefore;

Acquisition of information relevant to the condition of componentry on or proximate to a cell signal transmission structure;

Acquisition of information relevant to inventorying componentry on or proximate to a cell signal transmission structure;

Inspection of roof top mounted equipment in the expanding network of 5G

Groups of equipment; and

Ground Components (Meter Banks, transformers, Wave-Guides, etc) where size and labeling matter, you also have Support Equipment (transmission Lines, waveguides, duplexors, etc) on the tower, where dimensions are important;

A cellular signal transmission structure can comprise a number of physical features that can affect the ability to automatically extract features from images acquired from a UAV, for example. Cell towers include a variety of components that are relevant to the functionality of the structure itself, as well as its performance in the network. These can be collected under the general term "geometric features." Mapping of such geometric features in an inspection scenario such as their location, type, and condition can be an essential task in every cellular signal transmission structure project. This can be very time consuming and error-prone if done manually. The present disclosure allows at least part of the overall inspection process to be automated by making the image analysis step substantially automatic through a combination of signal processing, image processing, computer vision, machine learning, and/or artificial intelligence, that is, in some aspects, with substantially no human supervision. Analysis and use of information derived from the images can also be substantially automated.

Such derived information can be used to generate accurate 2D and 3D digital representations that can include accurate semantic data about the cellular tower transmission structure, componentry thereon, or aspects of the location in which the structure is present. In a further aspect, an accurate 3D model of the structure can be generated, which can include accurate semantic data about the cell tower, componentry thereon, or locations proximate thereto can be generated from the derived information. Yet further, accurate 3D topology of the structure can be generated, which can include accurate semantic data about the cellular signal transmission structure of interest, componentry thereon, or locations proximate thereto can be generated from the derived information. Ground Control Points (GCP) can assist in optimization of the relative and absolute accuracy of these 3D representations. Moreover, such 3D digital representations, 3D models, and 3D topography can be evaluated by a computer, a user, or both to provide complete and in-depth inspection information of the all or part of the cell signal transmission structure of interest and areas proximate thereto.

The 2D and/or 3D information comprising sematic data pertinent to the cell tower of interest and surrounding areas can have utility in one or more of CAD software, inventory management software, maintenance software, signal strength analysis and coverage software, life-cycle management software, cost estimation and bidding software, disaster management or system failure analysis, etc.

In accordance with a data acquisition event from which the inspection information can be derived, a UAV can be flown to and around the cellular tower transmission structure to capture a plurality of overlapping images thereof. In one aspect, an automated flight plan can be used to define and deploy the navigation of the UAV to and from the cellular signal transmission structure. When the UAV is proximal to the cell tower, an automated sensor operation process can be used to acquire images of the cell tower, where those captured sensor data can be acquired and processed according to the methodology discussed herein. In this regard, an automated capture plan can provide suitable positioning of the UAV imaging device so as to acquire images that can be processed to provide inspection level detail of the structure. As would be recognized, the application of an automated flight and sensor data capture plan can provide a fully automated cellular tower transmission structure inspection. In further aspects, either the flight plan or the imaging plan can be automated, thus providing at least partial automation of the inspection process. Such automated or partially automated flight and image capture is disclosed in the '735 Application, previously incorporated by reference.

In a further aspect, the navigation of a UAV to the location proximate to the physical asset(s) of interest, for example, a cell tower, and the acquisition of sensor data of the asset(s) and areas proximate thereto can be acquired by a human pilot in accordance with instructions that can be provided directing him to the optimum locations and positioning of the UAV relative to the physical asset(s) so as to acquire sensor data suitable to provide inspection level detail. Alternatively, images acquired by a human pilot can be automatically selected or deselected to provide the appropriate characteristics in context for the specific user information goal. Even with such human piloting, the sensor data processing of the present disclosure provides significant improvements over the prior art that requires human review of acquired images, either in real time or after the fact.

Imaging of a cellular tower transmission structure and locations proximate thereto can be commenced when at least one sensor is proximate to the cellular tower scene, such as with a UAV. In this regard, imaging can be provided by movement of an imaging device through and around and up and down around the scene in the proximity of the cellular tower transmission structure or other area(s) interest to the operation, placement, etc. thereof in a manner that provides suitably overlapping images of a quantity and quality to allow captured images from which useful information can be derived. The sensor data acquisition step can also be associated with other data acquisition relevant to cellular tower inspection. In this regard, the UAV or MAV can be equipped with sensors that can acquire EMF information relevant to the signal type and strength (or lack thereof) of the cellular tower transmission structure. Still further, the UAV or MAV can be equipped with an infrared sensor that can identify "hotspots" that would indicate an actual or potential electrical malfunction of the cellular tower transmission structure.

While a number of methodologies can suitably be used to generate the data acquisition for a cell tower inspection to acquire images from which inspection level detail can be provided substantially automatically therefrom, in a specific example, an orthographic aerial image of the cellular tower transmission structure can be obtained prior to designing a UAV image capture plan. In another example, a set of oblique aerial images can be obtained prior to designing the capture plan from existing database information. Confirmation of the true center of the cellular signal transmission structure and height confirmation, such as is possible from these first acquired images, can account for absolute accuracy errors. Such information can be provided to the UAV during image acquisition to allow equal distance of the columns and orbits on the cellular signal transmission structure during image acquisition.

The processes of the present disclosure can also be used in conjunction with a 3D tool for visualizing and manipulating 3D point clouds and wireframes as disclosed in U.S. Pat. No. 10,032,310, the disclosure of which is incorporated herein in its entirety by this disclosure. In some aspects, this visualization tool can enable a user to interact with acquired sensor data and corresponding images such that the accuracy, confidence level, and completeness of the automatic processing algorithms can be verified or enhanced, which can be relevant if assistance is required to generate a reliable CAD representation of the cellular tower transmission structure of interest and any additional elements that may be relevant to the inspection thereof.

The referenced 3D visualization tool can be architected and implemented for the purpose of providing "visual confidence" for a user. This can provide users with the ability to visualize the digital CAD model of a physical asset(s) of interest, verify the automatically extracted 3D geometry and topology, and adjust any part of the model that they deem incorrect. This activity can be used to expand the architecture and implement to a level suitable to address the requirements for all three components of a comprehensive 3D model of the physical asset(s) of interest, namely geometry, topology, and semantics. For semantics, at least the following functionality can be pertinent: free-form 2D and 3D annotation, free-form 2D and 3D segmentation, and attaching text-based or voice-based and relational notes to individual or groups of objects, geometrical elements, images, etc. Such workflow can be implemented automatically, via manual selection by a user, or a combination of both automatic and manual. In some implementations, a user can select or deselect options presented to him, with the system configurable to store such user-specific preferences for subsequent use in subsequent processes.

In implementations of the 3D tool include can relate to optimization features that include, in non-limiting examples:
 tool optimization points to support 3D annotation, machine learning
 optimal image selection based on the image relationship to its component
 application of gauging tools to 2D images to find relative mid points
 display angles between lines to know when 90 degrees
 having 2D and/or 3D templates for more rapid/complete quality assurance
 selection of desired camera view in the tool camera views layer for display in 2D
 creation of a point on a 2D image(s) without creating 3D point first (i.e., manual tie points)
 generating an auto crop/filter point cloud based on a ground control point locations
 snap to top view, east view, etc, azimuth/down-tilt controls
 auto AeroPoints detection
 points coloring tool for point classification
 3D ROI box viewing for rad level viewing/hiding based on customer
 Machine learning signage detection in scene (e.g., physical asset(s) of interest owner or component model #)
 Detection of components adjacent to the asset, but not located within the footprint of the asset
 bearing/compass controls
 perspective/ortho view mode
 machine learning detection of asset structure type (e.g., type of cell tower structure: guyed, self-supported, monopole, etc.)

With respect to a cell tower report specifically, the following can be provided to a user as output when the user information goal is such a report:
 number of levels detected,
 empty levels, empty antenna supports.
 rad per level detect,
 radiance patterns project,
 top of tower/tower level, tower center detection
 base plan detect (gravity vector)
 gps data of vertices in scene
 assessment grade/rating/health of tower
 encroaching vegetation detect
 hazardous condition detection (hot spots, shorting conditions, birds nest, poor draining/water pooling)
 best tower level and position to place new antenna-type component Yet further, the present disclosure can be used to acquire images from which locations for cellular tower transmission structure construction can be identified or qualified automatically. For example, images acquired of a location can be used to evaluate an area, such as a ground or roof, location for tower placement. In this regard, one or more of the following can be relevant:
 Is there an unobstructed view from the cellular tower transmission structure to populated areas
 Degree of current and future vegetation growth
 Building information
 Weather patterns in area
 Proximity of airports or airport flight patterns Information generated from the methods herein, such as extracted geometric data, can be utilized in physical asset inventory databases to associate the assets, or a plurality of assets, with contractual aspects related to the operation thereof, such as lease payments and the like. Yet further, the generated information can be associated with maintenance databases and schedules.

The methodology herein can also provide either or both of 2D or 3D visualizations to illustrate a current condition for a physical asset of interest and an as-designed or as-built condition, such as used in a BIM application. This could include a 2D or 3D heatmap showing differences in a color forma, segmented point cloud, masked images, binary images or the like.

Yet further, metadata can be generated such as, for example, grouping or categorization of information based on damage type, geometry, geo-location, elevation, etc.

A list of images can be selected to extract information pertinent to the user information goal. In this regard, not all acquired images may be suitable to generate inspection level detail of an aspect of a physical asset of interest. For example, in order to extract width and height of an antenna-like component for a cell tower, it might be more accurate to use images that were taken while rotating around the antenna array. However, in order to extract the height or elevation of the component of interest from the ground, it might be more accurate to only use the images that were captured while moving up/down the tower. This can be pertinent to an optimum view selection strategy. Still further, altitude filtering of images can be beneficial, as well the efficiency of image capture patterns to generate the desired information from the image acquisition step. 2D and 3D images can also be linked.

In a further aspect, a subset of images out of the total number of images that were acquired in a data acquisition event incorporating image can be selected for manual inspection by a human supervisor as opposed to providing all images acquired from the step to him, which could number in the thousands for an image acquisition event. In one implementation, a minimum number of images that will adequately cover all of the surfaces that are to be inspected can be selected automatically for presentation to a human substantially without presenting duplicate image information to a human supervisor. Such a process can allow the processing of the acquired images to identify images that incorporate duplicate image information, where such image information is effectively redundant or even detrimental, to the completion of the user information goal. Information derived from such a de-duplication process can be incorporated in subsequent data acquisition plan generation with a goal of designing better image capture in subsequent image acquisition events.

Information or output generated from the methods herein, such as extracted data from existing databases, data acquisition plan, and instructions/prescriptions, data capture limitations and constraints, extracted geometric, topological, and semantic data from the processing pipeline, human interaction and input to the data collection or processing system, etc., can be represented/visualized/reported in several formats with varying levels of detail according to the user information goal. This is related to the fact that the system can be configured to establish correspondences between any 2D and/or 3D data that is captured via different sensor types or that is derived from the sensor data from the processing step(s). Maintaining a map of 2D data to 3D geo-located data in the system and vice versa can be a useful tool to enable the system to convert at least some 2D data to 3D data using visual triangulation or point cloud indexing algorithms while being able to convert any 3D data to 2D data via perspective/orthographic/panoramic projection algorithms.

The output of the sensor and other data processing step can be presented to the user in the form of a pdf report, CAD drawing, interactive web-based 3D visualization tool, spreadsheet, etc. In some implementations, the user can manually select the desired output. Such output selection can be generated as result of a user or operator workflow. Yet further the user can select categories of output desired in context. For example, if the user will be generating engineering-type drawings with the output, such output can include the typical content thereof, such as scale, technical equipment nomenclature, directional information, etc. If the user will be providing the output to a customer, such as a homeowner or business person, the output can be presented in a format that is more aesthetically directed, which can mean that engineering-type information is omitted or minimized in the generated output. In some implementations, the output format can be generated automatically by the computer by evaluation of the user information goal and determining, such as with a machine learning process, what a preferred or appropriate format selection for the output would be in context.

The output can also be represented using an interactive web-based visualization tool that enables data representation in a number of pre-defined templates or a set of on-the-fly user-defined templates that are unknown to the system beforehand. That is, a user can create an output that is relevant to him in the context of his current information goal. Such user-generated preferences can be stored for later use by the user or his team, and such user-preference information can be incorporated into existing database information and/or machine learning processes to enhance and enrich operations.

The system comprises the components and elements of the data capture and processing output in local memory of the computer, local memory of the browser, online databases, and/or cloud-based storage and databases that allow generation a virtually unlimited number of unique reports based on different configurations of these components considering the user information goal. In addition, any of these web-based representations of the output could be directly converted or printed to a pdf file. In an exemplary format, the output representation could include a detailed section defining the user information goal and context followed by any findings from querying existing database resources and whether those findings satisfy the user information goal so that further data acquisition/capture may not be necessary. If not, a detailed optimum data capture plan can be provided that contains the assumptions and constraints that led to the data acquisition plan.

The data acquisition plan can be visualized for a user etc. in different formats ranging from tabular data to an embedded 3D interactive window that overlays the capture plan on a 3D rendering of the asset in the form of an orthographic aerial imagery, 3D point cloud, 3D mesh, digital surface model, digital elevation model, digital terrain model, BIM, CAD model/drawing, virtual 3D object rendering, orthomosaic imagery, etc.

The output representation could also include elements from the raw captured data that best satisfy a query or a set of queries including but not limited to the optimum image that captures the asset from a specific direction (such as north, south, east, west, top-down, etc.), image that has the highest SSD for a specific object or surface, image that has the minimum occlusion for a specific object or surface, image that has the optimum view angle for a specific object of surface, image that has the highest confidence level in identifying a specific object type, etc. The output representation could also include a variety of tables and charts that summarize the data according to categories such as object label, size, material, shape, geometry, topology, semantics, etc.

Yet further, the output representation could include perspective/orthographic/panoramic projection of individual or all identified object boundaries, surface boundaries, deficiencies, object labels, topological elements, etc. onto individual or all imagery that contains a complete or partial view of the given target. While the projected data can be drawn on this imagery, the image set could also be sorted and presented according to multiple factors including but not limited to view angle, angle of triangulation, SSD, completeness, image blurriness, prediction confidence, object categories, image overlap, etc. On the other hand, the output representation could include 3D coordinates (or 3D bounding volume) of data identified in multiple overlapping 2D RGB or thermal imagery.

Yet further, the interactive web-based visualization tool could dynamically fetch data or information from local memory of the computer, local memory of the browser, online databases, and/or cloud-based storage and databases which includes but not limited to dynamically pulling down images from a database that view a certain location or object that a user has pre-defined or selected on-the-fly.

Yet further, the generated information can be represented in 3D, 4D (time), and/or 5D (cost) such that not only does it show local/global 3D coordinates of different components, but also demonstrates the change over time or it demonstrates the information over time and cost. This includes, but is not limited to, change detection and visualization, life-cycle visualization of the asset, history of different actions performed on the asset, life-span of the asset, asset depreciation, and discrete events during the life-cycle of an asset such as a repair, assessment, demolition, renovation, etc. As an exemplary process, this can be implemented using a navigation bar or a slider bar that visualizes all or some discrete events that occurred during the life-cycle of the physical asset or collection of physical assets of interest. Such a bar can enable a user to navigate through any time in the history of the asset and access details about each event and its correlation with other events.

Yet further, the output representation could enable a user to qualitatively and quantitatively simulate the outcome/impact of a user-defined or computer-defined action or a series of actions for repair or maintenance relevant to the physical asset. The simulation demonstrates what happens if a certain action such as a full or partial repair is performed in a certain time, how much it costs, what crew members and expertise are needed, and how that impacts the life-span, health, maintenance, serviceability, etc. of the physical asset over time in future.

Yet further, the output representation could be enhanced using a color coding scheme or heatmap that colors different segments of the data for better and more comprehendible visualization. The segments could be defined based on geometry, topology, semantics, accessibility, time, location, elevation, pitch, surface area, surface type, health, repair cost, assessment cost, construction cost, progress, deviation from the as-planned features, etc.

Yet further, the output representation could include a variety of charts or schematic diagrams that would indicate the depreciation of the physical asset and the cost of repair over time. These could demonstrate how expensive the assessment program was vs. how much the assessment program saved the facility owner, property manager, facility operator, etc. Different axes could refer to asset depreciation, assessment cost, assessment time, repair actions, repair cost, repair time, etc.

Yet further, the output representation could include derived warnings or recommended plan of actions based on the data, business rules, and best practices. For example, when the height of parapet walls on a building roof exceeds 4 feet, it is recommended to order a crane for transferring any material from the ground onto the roof. Or, the system can automatically determine whether a ladder/crane is required to access the roof and what the best route for the access is. This could also include the mobilization or cost of crew deployments based on different assumptions in the given project.

Yet further, the output representation could include guidelines for an assisted or turn-by-turn walkthrough plan for the assessment crew that enables them to not only keep their situational awareness all the time but also traverse the assessment or inspection area in an optimum manner. The plan could also include the optimum route a specific object or deficiency of interest from a starting point that could be pre-defined or selected on-the-fly.

Yet further, the output representation could include dynamic filters allowing a user to pre-define or define on-the-fly one or a set of parameters based upon which the output information could be filtered. These parameters could include but not limited to location, view angle, geometric and semantic properties of one of more surfaces, slope, elevation, field of view, resolution, pitch direction, surface label, object types, object categories, confidence level, triangulation angle, projection type, camera type, sensor type, etc.

Yet further, the output representation could include a location context map to indicate the location of a deficiency with respect to the entire project location or boundary. For example, if a user is looking at a certain deficiency of object, this can highlight the underlying surface on an overall map of the physical asset so the global situational awareness is preserved no matter how detailed the user is looking into a deficiency or object.

Yet further, the output representation could be in the form of an OBJ or FBX file including a virtual 3D model of the physical asset consisting of all the findings and metadata with precise locations and specifications. This can allow virtual walkthroughs by a user using an AR/VR headset and visualizing/analyzing the physical asset without the need to visit the project site in person.

Still further, the output representation could include a machine-readable optical label that contains information about the item to which it is attached (e.g., QA code, barcode, etc.). These labels would be printable on any paper version of the output representation so that a user can switch between the paper copy and a digital interactive copy of the output at any desired time by just scanning the label using a mobile phone, camera, or web-cam.

Yet further, the system could allow a user to manually or automatically attach metadata or other relevant information/file to the data while capturing, processing, or visualizing the data. For example, if the system recommended a data capture plan including taking pictures using a mobile camera on top of a commercial roof, the person who is taking pictures would be able to simultaneously record his/her voice presenting any sort of useful information. The system will automatically establish correspondences between these recordings and other data. The user can then access those attached metadata based on content, location, time, etc.

Referring next to FIG. 1, shown is a flowchart illustrating an example of a data acquisition planning methodology as disclosed herein. Beginning at 103, a user information goal can be provided, e.g., by a computer, operator or user for a physical asset or collection of physical assets of interest. The user information goal can comprise user information for acquisition, processing, or output of data associated with the physical asset or collection of physical assets of interest. User information can comprise, e.g., context and goal information that can refine and focus the user information goal. In some implementations, the user information may be acquired through questions and/or queries sent to the computer, operator or user. A request may then be generated requesting data or other information to fulfill the user information goal.

The need for a data acquisition plan can then be evaluated by at least one computing device (e.g., the computer and/or other computers) at 106. Initially, existing database information 109 can be evaluated at 106 to determine whether information or data is available from the existing database information 109 that would fulfill part or all of the user information goal. A query for information to fulfill the user information goal can be sent to one or more databases, which can include, e.g., historical databases, domain knowledge and/or rules associated with user information goal and/or the physical asset or collection of physical assets of interest. Some or all of the requested information may be retrieved from the existing database information and evaluated at 106 to determine if the information set is sufficient to complete the user information goal.

If the user information goal cannot be satisfied using the information set retrieved from the existing database information, then a data acquisition plan to obtain any missing or additional information needed to substantially complete the user information goal can be generated at 112. The data acquisition plan in 112 can utilize at least some of the data available from the existing database information. This data from the existing database information can be incorporated into the data acquisition plan and/or can be included in information associated with the execution of the data acquisition plan. At least some of the data acquired by execution of the data acquisition plan can comprise sensor data associated with the physical asset or collection of physical assets of interest. For example, the sensor data can include images, thermal data, RF data, and etc. of the physical asset or collection of physical assets of interest that can be used to fulfill the user information goal. A request for data acquisition based upon the data acquisition plan can be sent at 115 and the data acquired at 118 as has been previously described.

After the data acquisition 118 is complete, the acquired data can be added to the context information provided at 103 and the process can return to 106 to again evaluate whether additional information or data is available from the existing database information 109 that would fulfill the user information goal. The user information goal can also be changed or updated at 103. If needed, another query for information to fulfill the user information goal can be sent to the databases. If the user information goal cannot be satisfied using acquired data from 118 and the information set retrieved from the existing database information, then another data acquisition plan can be generated at 112 to obtain any missing or additional information needed to substantially complete the user information goal. This data acquisition cycle can be repeated as needed to satisfy the user information goal.

If the user information goal can be satisfied or substantially completed using the information set retrieved from the existing database information, then the information set, context information from 103 and/or data acquired at 118 can be processed at 121 to provide an output (e.g., a report or notification) at 124 to fulfill or substantially complete the user information goal. The output can include results such as retrieved or acquired data or other information to satisfy the user information goal. Other actions may also be taken based upon the information set, context information and/or acquired data at 121. For example, information and/or data can be stored in the existing database information 109 for subsequent access and use in evaluation of subsequent user information goals.

Figure 2:
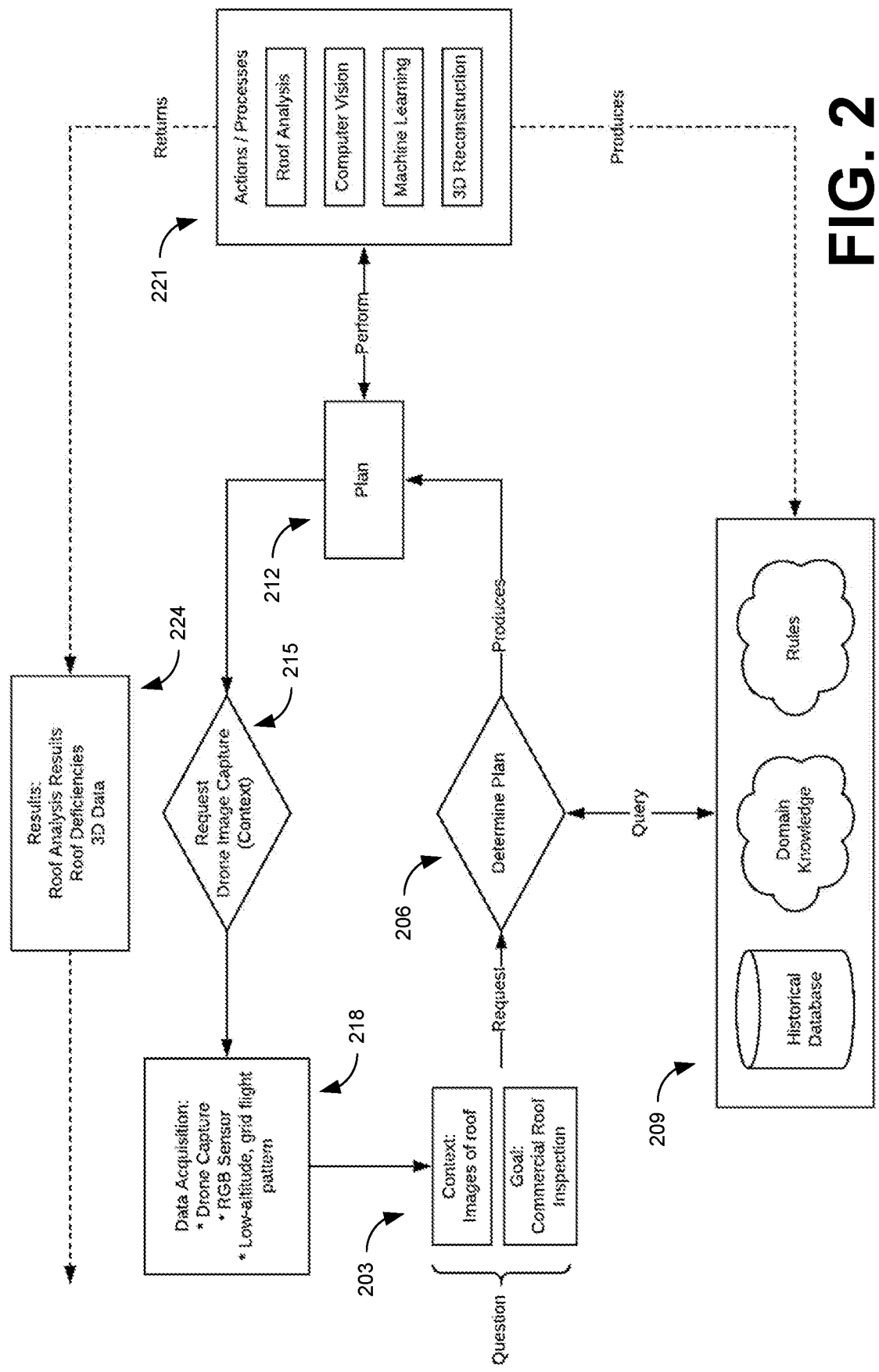

FIG. 2 illustrates an example of the data acquisition planning methodology of FIG. 1 in the context of a commercial roof inspection. Beginning at 203, a user (e.g., a roofing contractor) provides a user information goal requesting a commercial roof inspection. The user also provides context information such as the address of the building, images of the roof, etc. which may assist in fulfilling the user information goal. In some implementations, questions and/or queries may be generated by the at least one computing device asking the user for additional data or other information that may assist in fulfilling the user information goal.

Next, the need for a data acquisition plan is evaluated by the at least one computing device at 206. Existing database information 209 can be evaluated at 206 to determine whether information or data is available from the existing database information 209 that would fulfill part or all of the user information goal. A query for information can be sent to one or more databases 209 to fulfill the user information goal. Some or all of the requested information may be retrieved from the existing database information and evaluated at 206 to determine if the information set is sufficient to complete the user information goal.

If the user information goal cannot be satisfied using the information set retrieved from the existing database information, then a data acquisition plan to obtain any missing or additional information needed to substantially complete the user information goal can be generated at 212. In this example, additional information to complete the roof inspection is needed and a data acquisition plan is generated at 212 to gather current images and other pertinent sensor data of the roof using an unmanned aerial vehicles (UAV) equipped with sensors to acquire the needed images, etc. A request for data acquisition using a drone with image capture capabilities is sent at 215 and the data acquired at 218. The data acquisition can be carried out to fulfill the data acquisition plan using, e.g., drone capture information, RGB or other sensors, low-altitude grid flight pattern, etc. The data acquired at 218 can then be added to the context information from 203 and used at 208 to evaluate whether additional information or data available from the existing database information 209 is needed to fulfill the user information goal. The user information goal can also be changed or updated at 203.

If the user information goal can be satisfied or substantially completed, then the information set, context information from 203 and/or data acquired at 218 can be processed at 221 to provide an output (e.g., a report including roof analysis results, roof deficiencies, 3D data, etc.) at 124 to fulfill or substantially complete the user information goal. Actions and processes that can be carried out at 221 can include roof analysis, computer vision analysis, machine learning, 3D reconstruction, etc. using the data and information as has been previously described. The information and/or data in 121 can also be stored in the existing database information 209 for subsequent access (e.g., by the user) and used in evaluation of subsequent user information goals.

Figure 3:
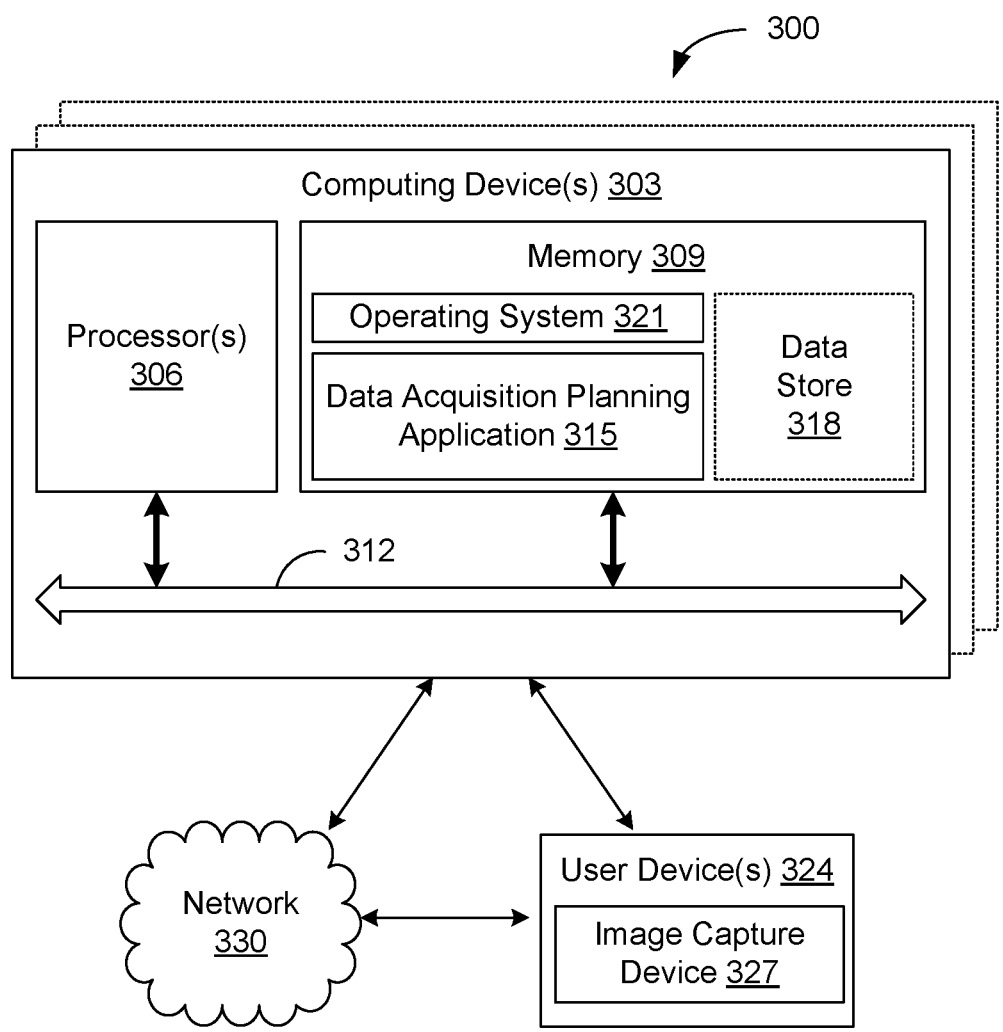
FIG. 3 is a block diagram illustrating an example of a system that can be used for a data acquisition planning methodology, in accordance with various aspects of the present disclosure.

Referring now to FIG. 3, shown is an example of a system 300 that may be utilized for the data acquisition planning methodology disclosed herein. The system 300 can be one or more computing device(s) 303 or other processing device(s), which includes at least one processor circuit, for example, having a processor 306 and a memory 309, both of which are coupled to a local interface 312. To this end, the computing device(s) 303 may comprise, for example, a server computer, mobile computing device (e.g., laptop, tablet, smart phone, etc.) or any other system providing computing capability. The computing device(s) 303 may include, for example, one or more display or touch screen devices and various peripheral devices. Even though the computing device 303 is referred to in the singular, it is understood that a plurality of computing devices 303 may be employed in the various arrangements as described above. The local interface 312 may comprise, for example, a data bus with an accompanying address/control bus or other bus structure as can be appreciated.

Stored in the memory 309 are both data and several components that are executable by the processor 306. In particular, stored in the memory 309 and executable by the processor 306 include a data acquisition planning application 315 and potentially other applications. Also stored in the memory 309 may be a data store 318 and other data. The data stored in the data store 318, for example, is associated with the operation of the various applications and/or functional entities described below. For example, the data store may include databases, object libraries, and other data or information as can be understood. In addition, an operating system 321 may be stored in the memory 309 and executable by the processor 306. The data store 318 may be may be located in a single computing device or may be dispersed among many different devices. The components executed on the computing device 303 include, for example, the data acquisition planning application 315 and other systems, applications, services, processes, engines, or functionality not discussed in detail herein. It is understood that there may be other applications that are stored in the memory 309 and are executable by the processor 306 as can be appreciated. Where any component discussed herein is implemented in the form of software, any one of a number of programming languages may be employed.

The system 300 can be configured to communicate with one or more user device(s) 324 (e.g., an unmanned aerial vehicle, mobile computing device or other mobile user device) including an image capture device 327. For example, the user device(s) 324 can be communicatively coupled to the computing device(s) 303 either directly through a wireless communication link or other appropriate wired or wireless communication channel, or indirectly through a network 330 (e.g., WLAN, internet, cellular or other appropriate network or combination of networks). In this way, capture plan information, acquired image information or other information can be communicated between the computing device(s) 303 and user device(s) 324.

A number of software components are stored in the memory 309 and are executable by the processor 306. In this respect, the term "executable" means a program file that is in a form that can ultimately be run by the processor 306. Examples of executable programs may be, for example, a compiled program that can be translated into machine instructions in a format that can be loaded into a random access portion of the memory 309 and run by the processor 306, source code that may be expressed in proper format such as object code that is capable of being loaded into a random access portion of the memory 309 and executed by the processor 306, or source code that may be interpreted by another executable program to generate instructions in a random access portion of the memory 309 to be executed by the processor 306, etc. An executable program may be stored in any portion or component of the memory 309 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 306 may represent multiple processors 306 and the memory 309 may represent multiple memories 309 that operate in parallel processing circuits, respectively. In such a case, the local interface 312 may be an appropriate network that facilitates communication between any two of the multiple processors 306, between any processor 306 and any of the memories 309, or between any two of the memories 309, etc. The local interface 312 may comprise additional systems designed to coordinate this communication, including, for example, performing load balancing. The processor 306 may be of electrical or of some other available construction.

Although the data acquisition planning application 315, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the data acquisition planning application 315, that comprises software or instructions can be embodied in any non-transitory computer-readable medium for use by or in connection with an instruction execution system such as, for example, a processor 306 in a computer system or other system. In this sense, the logic may comprise, for example, statements including instructions and declarations that can be fetched from the computer-readable medium and executed by the instruction execution system. The flowcharts or diagrams of FIGS. 1 and 2 show examples of the architecture, functionality, and operation of possible implementations of a data acquisition planning application 315. In this regard, each block can represent a module, segment, or portion of code, which comprises one or more executable instructions for implementing the specified logical function(s). It should also be noted that in some alternative implementations, the functions noted in the blocks may occur out of the order noted in FIGS. 1 and 2. For example, two blocks shown in succession in FIGS. 1 and 2 may in fact be executed substantially concurrently or the blocks may sometimes be executed in a different or reverse order, depending upon the functionality involved. Alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Communication media appropriate for use in or with the inventions of the present disclosure may be exemplified by computer-readable instructions, data structures, program modules, or other data stored on non-transient computer-readable media, and may include any information-delivery media. The instructions and data structures stored on the non-transient computer-readable media may be transmitted as a modulated data signal to the computer or server on which the computer-implemented methods of the present disclosure are executed. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein may include both local non-transient storage media and remote non-transient storage media connected to the information processors using communication media such as the internet. Non-transient computer-readable media do not include mere signals or modulated carrier waves, but include the storage media that form the source for such signals.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

At this time, there is little distinction left between hardware and software implementations of aspects of systems; the use of hardware or software is generally (but not always, in that in certain contexts the choice between hardware and software can become significant) a design choice representing cost vs. efficiency tradeoffs. There are various information-processing vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various aspects of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the aspects disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable type medium such as a floppy disk, a hard disk drive, a CD, a DVD, a digital tape, a computer memory, etc.; and a remote non-transitory storage medium accessed using a transmission type medium such as a digital and/or an analog communication medium (e.g., a fiber optic cable, a waveguide, a wired communications link, a wireless communication link, etc.), for example a server accessed via the internet.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described herein, the exemplary aspects have been described and illustrated in the drawings and the specification. The exemplary aspects were chosen and described in order to explain certain principles of the invention and their practical application, to thereby enable others skilled in the art to make and utilize various exemplary aspects of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

Therefore, at least the following is claimed:

1. A method of data acquisition and processing for generation of an output for use in analysis of a physical asset or collection of physical assets of interest, comprising:
   a) providing, by at least one computer, operator, or a user, a first user information goal comprising one or more of acquisition, processing, or output of data associated with a physical asset or collection of physical assets of interest, wherein at least part of the data comprises image data; and
   b) evaluating, by the at least one computer, existing database information to determine whether all or part of the first user information goal can be substantially completed by retrieval and processing of an information set derivable from the existing database information, wherein the existing database information comprises at least some image data already available for the physical asset or collection of the physical assets of interest, and:
      i) if the first user information goal can be substantially completed by the retrieval and processing of the information set derivable from the existing database information:
         (1) determining that a new unmanned aerial vehicle (UAV) data acquisition event is not needed to substantially complete the first user information goal;
         (2) retrieving the information set derivable from the existing database information determined to substantially complete the first user information goal from the existing database information; and
            (a) either or both of
               (i) processing the retrieved information set derivable from the existing database information to provide an output in the form of a report or notification to the user, operator or the at least one computer; or
               (ii) storing the retrieved information set in a database for use as existing database information in a subsequent process; or
      ii) if the first user information goal cannot substantially be completed by the retrieval and processing of the information set derivable from the existing database information:
         (1) determining that the new UAV data acquisition event is needed to substantially complete the first user information goal;
         (2) generating a first data acquisition plan configured to acquire additional data needed to substantially complete the first user information goal, wherein:
            (a) at least some of the additional data acquirable by execution of the first data acquisition plan comprises additional image data associated with the physical asset or collection of physical assets of interest; and
            (b) at least some data available in the existing database information:
               (i) is incorporated in the first data acquisition plan; or
               (ii) is included in information associated with execution of the first data acquisition plan.

2. The method of claim 1, wherein the first data acquisition plan is executed, and an output of the first data acquisition plan is sensor data, and wherein the sensor data is processed to generate a processed information set configured to substantially complete the first user information goal, and wherein the processed information set is:
   a) incorporated in the form of a report or notification to the user, operator, or the at least one computer; or
   b) stored in a database.

3. The method of claim 1, wherein the physical asset or collection of physical assets of interest comprise one or more of: telecommunications infrastructure, electrical transmission equipment, mechanical equipment, all or part of the external areas of a building, all or part of the internal areas of a building, landscape components, electrical transmission components, solar panels, wind turbines, transportation infrastructure, vehicles, or oil and gas collection and processing equipment.

4. The method of claim 1, wherein the first user information goal comprises one or more of: an inspection, an inventory, a performance assessment, a condition state assessment, building information management data generation, or lifecycle management information for the physical asset or collection of physical assets of interest.

5. The method of claim 1, wherein the first data acquisition plan is derived at least in part from one or more of:
   a) an identity of the physical asset or collection of physical assets of interest;
   b) a location of the physical asset or collection of physical assets of interest;
   c) rules associated with access to the physical asset or collection of physical assets of interest;
   d) a time period for completion of the first user information goal;
   e) a budget defined for completion of the first user information goal;
   f) a human skill set needed for completion of the first user information goal;
   g) a type of vehicle available to process the sensor data;

h) an inventory of sensor types and configured needed for completion of the first user information goal; or
i) a required accuracy percentage or confidence level required for all or part of the generated information.

6. The method of claim 1, wherein the at least one computer or the user can optionally reject the first data acquisition plan, wherein in response to rejecting the first data acquisition plan the method further comprises:
  a) providing, by the at least one computer, operator, or the user, a second user information goal for one or more of acquisition, processing, or output of data associated with the physical asset or collection of physical assets of interest, wherein at least part of the data comprises image data; and
  b) evaluating, by the at least one computer, a plurality of existing databases to determine whether all or part of the second user information goal can be substantially completed by retrieval and processing of data available in the plurality of existing databases and:
    i) if the second user information goal can be substantially completed from the data available in one or more existing databases of the plurality of existing databases:
      (1) determining that a new UAV data acquisition event is not needed to complete the second user information goal;
      (2) retrieving an existing information set determined to substantially complete the second user information goal from the one or more existing databases; and
        (i) providing the existing information set needed to substantially complete the second user information goal in the form of a report or notification to the user, operator, or the at least one computer; or
        (ii) storing the existing information set needed to substantially complete the second user information goal in a database; or
    ii) if the second user information goal cannot substantially be completed by retrieval and processing of data available in the one or more existing databases:
      (1) determining that the new UAV data acquisition event is needed to substantially complete the second user information goal;
      (2) generating a second data acquisition plan configured to acquire data needed to substantially complete the second user information goal, wherein:
        (a) at least some of the data acquirable by execution of the second data acquisition plan comprises sensor data associated with the physical asset or collection of physical assets of interest; and
        (b) at least some data available in the plurality of databases:
          (i) is incorporated in the second data acquisition plan; or
          (ii) is included in information associated with execution of the second data acquisition plan.

7. The method of claim 1, wherein the image data comprises Red-Green-Blue (RGB) imagery, thermal imagery, or depth imagery information.

8. The method of claim 2, wherein the image data included in the report or stored in the database is:
  a) retrieved from at least one existing database comprising archived image information; or
  b) generated from image data obtained from execution of the first data acquisition plan.

9. The method of claim 1, wherein the first data acquisition plan comprises a flight plan and sensor operation instructions for an unmanned aerial vehicle (UAV) comprising one or more sensors configured to acquire at least some image information associated with the physical asset or collection of physical assets of interest during execution of the first data acquisition plan.

10. The method of claim 1, further comprising executing the first data acquisition plan by generating sensor information associated with the physical asset or collection of physical assets of interest, wherein at least some two-dimensional (2D) or three-dimensional (3D) information about the physical asset or collection of physical assets are derivable from the generated sensor information.

11. The method of claim 2, wherein the existing database information is evaluated during or after execution of the first data acquisition plan, thereby optionally incorporating at least a portion of the existing database information with an acquired information set acquired during execution of the first data acquisition plan.

12. The method of claim 11, further comprising prior to or after generation of the first data acquisition plan:
  a) notifying the user, operator, or the at least one computer of an amount of deviation of the information set derivable from the existing database information from the first user information goal;
  b) presenting the user, operator, or the at least one computer with information about one or more of cost, time, and accuracy improvement required to achieve the first user information goal by execution of the first data acquisition plan; and
  c) providing the user, operator, or the at least one computer with an option to accept completion of the first user information goal by retrieval of the information set derivable from the existing database information without execution of the first data acquisition plan.

13. The method of claim 1, wherein at least some of the existing database information is operational with a machine learning process.

14. The method of claim 2, wherein:
  a) the notification or report is provided to the user, operator, or the at least one computer after execution of the first data acquisition plan;
  b) the notification or report includes the processed information set associated with substantial completion of the first user information goal; and
  c) information provided with the notification or report includes one or more of a percentage accuracy or a confidence level that the processed information set provided in the notification or report substantially conforms to the first user information goal.

15. The method of claim 1, wherein the existing database information is evaluated substantially in real time, thereby allowing the notification or report to be generated substantially in real-time when the determination that the new UAV data acquisition event does not need to be conducted to substantially complete the first user information goal.

16. The method of claim 1, wherein a form of the notification or report to be generated is selected by the at least one computer, user, or operator prior to, during, or after the first user information goal is substantially completed.

17. The method of claim 1, wherein:
  a) the physical asset or collection of physical assets of interest comprises telecommunications infrastructure in the form of one or more cellular towers;

b) the first user information goal is a cellular network tower inventory; and c) three-dimensional (3D) information derivable from the existing database information substantially completes the first user information goal without requiring either generation or execution of the first data acquisition plan.

18. The method of claim 1, wherein:

a) the physical asset or collection of physical assets of interest comprises telecommunications infrastructure in the form of a cellular tower;

b) the first user information goal is an inventory of equipment of on the cellular tower; and c) information derivable from the existing database information does not substantially complete the first user information goal, thereby requiring generation and execution of the first data acquisition plan.

19. The method of claim 1, wherein:

a) the physical asset or collection of physical assets of interest comprises telecommunications infrastructure in the form of one or more cellular towers;

b) the first user information goal is a current cellular network coverage assessment; and c) three-dimensional (3D) information derivable from the existing database information does not substantially complete the first user information goal, thereby requiring generation and execution of the first data acquisition plan.

20. The method of claim 1, wherein:

a) the physical asset or collection of physical assets of interest comprises telecommunications infrastructure in the form of a plurality of antennas for deployment as a fifth generation (5G) network array;

b) the first user information goal is a placement plan for each of the plurality of antennas in a plurality of locations; and c) information derivable from the existing databases does not substantially complete the first user information goal, thereby requiring generation and execution of the first data acquisition plan.

* * * * *